United States Patent [19]
Ichikawa et al.

[11] Patent Number: 5,412,172
[45] Date of Patent: May 2, 1995

[54] SPOT WELDING MACHINE

[75] Inventors: Wataru Ichikawa, Tokyo; Yuji Matsuki, Sayama; Seiji Hirohashi, Tokyo, all of Japan

[73] Assignee: Kabushiki Kaisha SG, Japan

[21] Appl. No.: 12,516

[22] Filed: Feb. 2, 1993

Related U.S. Application Data

[63] Continuation-in-part of Ser. No. 770,419, Oct. 3, 1991, Pat. No. 5,194,709.

[30] Foreign Application Priority Data

| | | |
|---|---|---|
| Oct. 8, 1990 [JP] | Japan | 2-270013 |
| Oct. 8, 1990 [JP] | Japan | 2-270014 |
| Jun. 28, 1991 [JP] | Japan | 3-185630 |
| May 12, 1992 [JP] | Japan | 4-146523 |
| Oct. 19, 1992 [JP] | Japan | 4-304400 |

[51] Int. Cl.$^6$ ............................................. B23K 11/30
[52] U.S. Cl. ................................. 219/86.41; 219/89; 219/91.1
[58] Field of Search ............... 219/89, 86.25, 86.41, 219/86.7, 91.1, 109

[56] References Cited

U.S. PATENT DOCUMENTS

| | | | |
|---|---|---|---|
| 4,542,277 | 9/1985 | Cecil . | |
| 4,734,555 | 3/1988 | Ferguson | 219/109 |
| 4,970,361 | 11/1990 | Fuse . | |
| 5,115,113 | 5/1992 | Miller | 219/89 |
| 5,225,647 | 7/1993 | Defrenne | 219/109 |

FOREIGN PATENT DOCUMENTS

| | | |
|---|---|---|
| 2211128 | 10/1988 | United Kingdom . |
| 2214119 | 1/1989 | United Kingdom . |
| 2216298 | 2/1989 | United Kingdom . |

*Primary Examiner*—Clifford C. Shaw
*Attorney, Agent, or Firm*—Graham & James

[57] ABSTRACT

A spot welding machine includes tip electrodes mounted on the tips of the first and second arms, respectively, a pressing actuator for moving at least one of the first and second arms to apply a pressing force to the tip electrodes, an interelectrode distance detector for detecting a distance between the tip electrodes, and a brake for braking the actuator. The distance between the tip electrodes, i.e., interelectrode distance can be set at any desired intermediate distance between the maximum and minimum distances, by braking the actuator when the arms are opened to a desired degree. In this manner, it is made possible to effectively reduce the required operation time, and by suitably performing such a brake control, it is also made possible to effectively lessen an impact caused when the tip electrodes come into contact with plates to be welded. A speed control device may be provided which variably controls the moving speed of the actuator in accordance with the interelectrode distance. In such a case, it is permitted to properly control the moving speed of the arms and hence of the tip electrodes in response to the current position of the arms, and therefore the contact impact can be effectively lessened.

28 Claims, 15 Drawing Sheets

SPOT WELDING MACHINE

RELATED APPLICATION

This application is a continuation-in-part application of our corresponding U.S. application Ser. No. 07/770,419 filed Oct. 3, 1991 under the title of "METHOD FOR CHECKING A SPOT WELDED PORTION AND SPOT WELDING MACHINE", which is now U.S. Pat. No. 5,194,709.

BACKGROUND OF THE INVENTION

The present invention relates to a spot welding machine for welding a plurality of plate materials or workpieces.

Spot welding is employed in many applications such as production line systems for automobile industries etc. since it allows thin metal plate materials (plate workpieces) to be efficiently welded in large quantity.

In such production line systems, there are popularly employed portable spot welding machines which are compact in size and light in weight and therefore can easily be moved to a desired welding spot. The portable spot welding machines, in general, comprise a welding gun, a secondary conductor, a welding transformer and a control device, and there are presently known two types of the portable spot welding machine, one being the type in which only a welding gun is moved to a welding spot, the other being the type in which a transformer gun comprising an integral combination of a welding gun and a transformer is moved to a welding spot.

The above-mentioned welding gun is typically constructed of a pressure source and pressing mechanism. As the pressure source, there are known an pneumatic type and an air hydraulic type, and as the pressing mechanism, there are known a C-shaped arm (press) type and a X-shaped arm (locker arm) type. Other conventionally known welding guns of this type are shown in, for example, U.S. Pat. Nos. 4,542,277 and 4,970,361, and U.K. Patent Application Laid-open Publication Nos. 2,211,128A, 2,211,129A and 2,216,298A.

In the welding guns of the C-shaped and X-shaped arm types, arms are caused to open or close by a pressing force supplied from the pressure source to thereby hold plate workpieces between tip electrodes, and the pressing force is applied to the workpieces between the tip electrodes. Then, welding current is applied to the electrodes to perform a spot welding operation.

But, because the arms are opened and closed only by the pressing force from the pressure source in order to control a distance between the electrodes (hereinafter referred to also as "interelectrode distance"), the prior art welding guns can set the interelectrode distance to only two extreme states, one being such a state where the arms are widely opened, i.e., the interelectrode distance is the maximum, the other being such a state where the arms are closed, i.e., the interelectrode distance is the minimum. The closed state of the arms means that plate workpieces are undergoing a spot welding operation while being held between the electrodes, and the opened state of the arms means that the welding spot is being moved with the electrodes being opened to the maximum degree. The prior art welding guns spot-weld the plate workpieces at their plural spots by repeating such opening and closing movements of the arms.

However, the prior art welding guns are not satisfactory in that a necessary operation time is very long due to the repeated opening and closing movements of the arms. Namely, after welding of the workpieces at one spot has been been completed, it is necessary to open the arms before the gun moves to a next welding spot. In other words, it is necessary to wait for a considerably long time until the arms are widely opened and hence the interelectrode distance reaches the maximum value. Therefore, the welding gun could not promptly move to the next welding spot, which was quite a waste of time.

Further, with the prior art welding guns, because the arms move a long distance from the opened state where the interelectrode distance is the maximum over to the closed state in order to hold the plate workpieces, a great impact tends to be given to the tip electrodes and plate workpieces when the electrodes come into contact with the workpieces. Such a contact impact causes the tip electrodes to wear in a very short period of time or causes damages like holes to the workpieces if they are thin.

Moreover, with the prior art welding guns, it is not possible to automatically detect such an unusual condition that the tip electrodes themselves remain attached or welded to the workpieces even after the arms are opened. Therefore, whether or not the tip electrodes are in the predetermined opened state must be directly checked with human eyes each time it is necessary to do so.

SUMMARY OF THE INVENTION

It is therefore a first object of the present invention to provided a spot welding machine which is capable of properly controlling a distance between tip electrodes.

It is a second object of the present invention to provide a spot welding machine which can prevent plate workpieces to be welded from being damaged by variably controlling the moving speed of tip electrodes in correspondence with a distance between the electrodes.

It is a third object of the present invention to provide a spot welding machine which can properly deal with unusual opened and closed states of tip electrodes.

In order to achieve the first object, a spot welding machine according to the present invention comprises first and second tip electrodes for holding therebetween plates to be joined with a pressing force of a predetermined magnitude and causing current to flow through the plates, first and second arms for supporting the first and second tip electrodes and transmitting the pressing force of the predetermined magnitude to the first and second tip electrodes, a pressing actuator for moving at least one of the first and second arms to apply the pressing force to the plates via said tip electrodes, a distance-between-electrodes detection section for detecting a distance between the first and second tip electrodes, and a brake means for braking a movement of said pressing actuator.

According to this spot welding machine, the pressing actuator moves at least one of the first and second arms to change the distance between the tip electrodes, i.e., interelectrode distance and to apply a pressing force to the tip electrodes. Because the movement of the pressing actuator can be braked by the brake section as desired, the first and second arms can be stopped at a desired position. Accordingly, by properly actuating the brake section, the first and second arms and hence the electrodes can be set at a desired intermediate position between the maximum and minimum positions. The interelectrode distance is detected by the distance-between-electrodes section. There may further be provided a control section which allows the interelectrode distance to be established as desired by suitably actuating the brake section in accordance with the interelectrode distance detected by the distance-between-electrodes section.

By such a control to position the arms at an intermediate position, the arms can be stopped at a desired intermediate position. In this way, even in the case where there are many spots to be welded, the arms only need to be opened to a predetermined intermediate position and then move to a next welding spot after spot welding at one spot has been completed, which minimize the distance over which the arms must move. This reduces the time required for the opening and closing movements of the arms and therefore the overall operation time required for spot welding can be substantially reduced. Further, because the arms can approach and hold the plates by closing lust from the intermediate position, momentum of the closing arms can be made small so that an impact caused when the electrodes come into contact with the plates can be reduced to a considerable degree. Furthermore, it is also possible that the movement of the arms is temporarily stopped by the brake section immediately before the tip electrodes contact the plate and then the brake means is deactuated, to permit a soft landing of the electrodes on the plates. Also in this way, the contact impact can be considerably reduced.

In such a case where a fluid-powered cylinder is used as the pressing actuator, the distance-between-electrodes detection section may detect the interelectrode distance in an indirect manner by detecting the moved position of a rod of the cylinder.

Alternatively, the distance-between-electrodes detection section may detect the interelectrode distance by directly detecting the moved amount of the first and second arms.

The brake sect ion may be a mechanical brake mechanism in which a brake bush is pressed against a cylinder rod of the pressing actuator and resultant frictional force is applied as a brake force to the cylinder rod. Alternatively, the required brake function may be achieved by controlling a fluid pressure circuit of the pressing actuator.

In the case where a fluid-powered cylinder is used as the pressing actuator, the distance-between-electrode detection section may detect the interelectrode distance in an indirect manner detecting the current position of the cylinder rod.

Alternatively, the distance-between-electrodes detection section may detect the interelectrode distance by directly detecting the moved amount of the first and second arms.

In order to achieve the second object, a spot welding machine according to the present invention comprises first and second tip electrodes for holding therebetween plates to be joined with a pressing force of a predetermined magnitude and causing current to flow through the plates, first and second arms for supporting the first and second tip electrodes and transmitting the pressing force of the predetermined magnitude to the first and second tip electrodes, a pressing actuator for moving at least one of the first and second arms to apply the pressing force to said plates via said tip electrodes, a detection section for detecting a distance between the first and second tip electrodes, and a speed control section for variably controlling a moving speed of said actuator in accordance with an output of said detection section.

According to this spot welding machine, because the speed control section variably controls the moving speed of the pressing actuator in accordance with the output of the detection section, i.e., the interelectrode distance, it is made possible to properly control the moving speed of the arms and hence of the tip electrodes in accordance with the moved position (opened degree) of the arms when the arms are opened or closed. For example, the moving speed of the pressing actuator can properly be controlled so as to reduce as the tip electrodes approach the plates. Thus, the tip electrodes can make a soft landing on the plates so as to lessen an impact caused when the electrodes contact the plates, and therefore, damages to the plates can be prevented and the electrodes themselves can be prevented from wearing.

In order to achieve the third object, a spot welding machine of the present invention comprises first and second tip electrodes for holding therebetween plates to be joined with a pressing force of a predetermined magnitude and causing current to flow through the plates, first and second arms for supporting the first and second tip electrodes and transmitting the pressing force of the predetermined magnitude to the first and second tip electrodes, a pressing actuator for moving at least one of the first and second arms to apply the pressing force to said plates via said tip electrodes, a detection section for detecting a distance between the first and second tip electrodes, and an electrode state determination section for determining, on the basis of an output of said detection section, whether or not the distance between said tip electrodes meets a predetermined reference value to thereby output a signal indicative of a state of said tip electrodes.

According to this spot welding machine, because the electrode state determination section outputs a signal indicative of the tip electrode sate by determining, on the basis of the output of the detection section, whether or not the interelectrode distance meets a predetermined reference value, it is made possible to readily detect unusual conditions such as welding to the plates of the tip electrodes themselves and therefore the unusual conditions can be readily dealt with in a proper manner.

Embodiments of the spot welding machine according to the present invention will now be described with reference to the accompanying drawings.

BRIEF DESCRIPTION OF THE DRAWINGS

In the accompanying drawings.

DETAILED DESCRIPTION OF THE PREFERRED EMBODIMENTS

Figure 1:
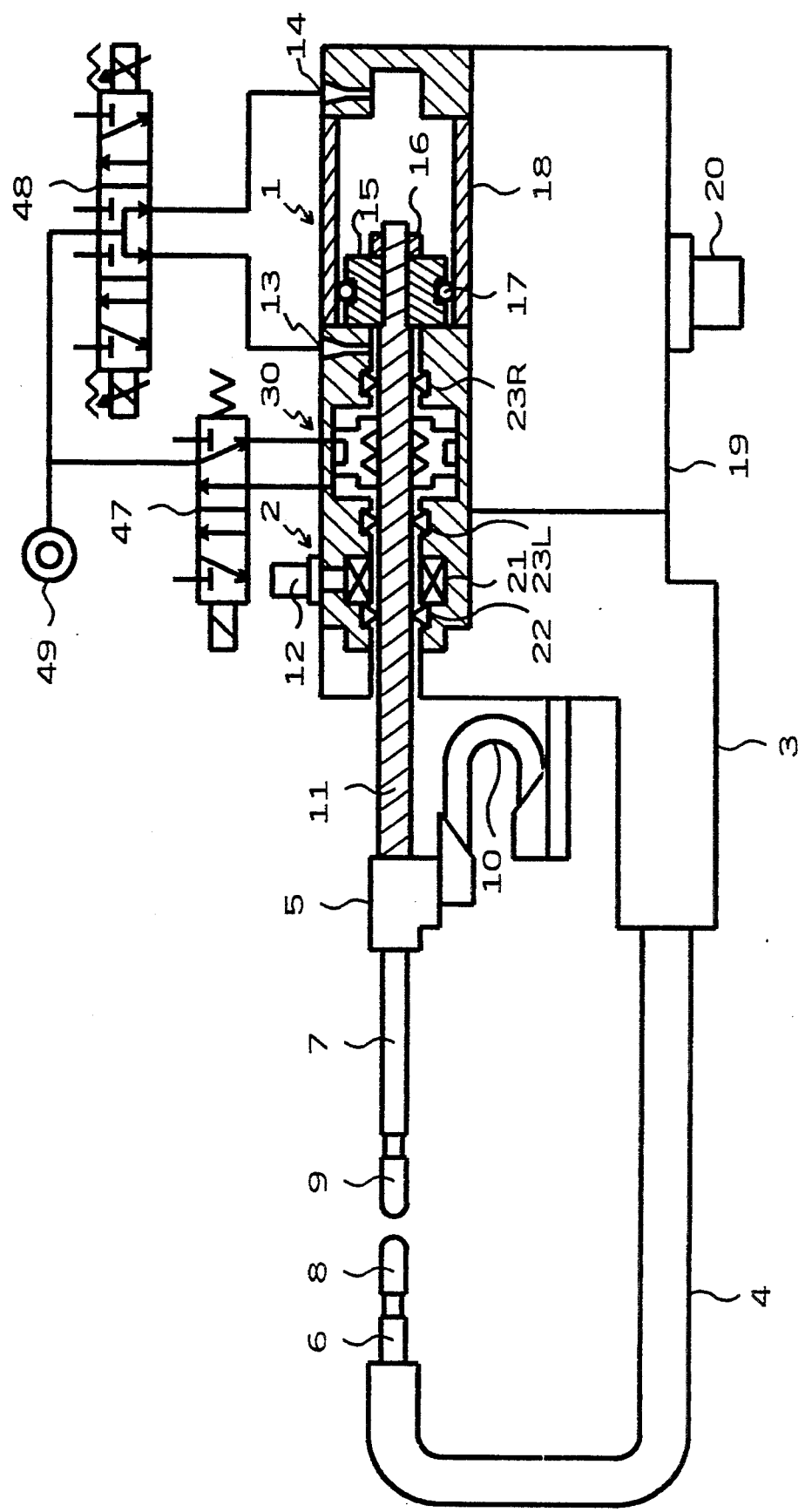
FIG. 1 is a side view, partly in section, showing schematically the entire structure of an embodiment of the spot welding machine according to the invention which is composed of a C-shaped welding gun.

FIG. 1 shows schematically the entire structure of the spot welding machine according to the invention. The spot welding machine of this embodiment is a portable type spot welding machine which is composed of a C-shaped welding gun and a welding transformer 19 combined integrally with each other. A pressing cylinder 1, a brake unit 30 and a position detector 2 of the spot welding machine are shown in section.

The welding gun includes the pressing cylinder 1, the position detector 2, the brake unit 30, an arm support member 3, an arm 4, a movable arm 5, electrode holders 6 and 7, tip electrodes 8 and 9 and a secondary conductor 10.

The portions of the welding gun other than the cylinder rod 11 of the pressing cylinder 1, the brake unit 30 and the position detector 2 are the same as the conventional welding guns and, therefore, these portions will be only briefly described.

The arm support member 3 holds the pressing cylinder 1, brake unit 30, position detector 2, arm 4 and welding transformer 19.

The arm 4 is of an L-shape and has the electrode holder 6. The arm 4 which receives pressing force from the pressing cylinder 1 is made with such rigidity that it will not be flexed by the pressing force.

The movable arm 5 is fixed to the foremost end portion of the cylinder rod 11 and is moved with the cylinder rod 11. The movable arm 5 holds the electrode holder 7 on the opposite side of the cylinder rod 11, connecting the electrode holder 7 electrically to the secondary conductor 10.

The tip electrodes 8 and 9 are inserted in the holders 6 and 7 and held thereby.

The tip electrodes 8 and 9 are in contact with plates to be joined with a predetermined pressing force and supply welding current between the plates to perform spot welding.

The secondary conductor 10 supplies welding current from the welding transformer 19 to the electrode holder 7 and tip electrode 9. Supply of current to the electrode holder 6 and tip electrode 8 is made through a secondary conductor (not shown) provided inside of the arm support member 3 and arm 4.

The welding transformer 19 is connected to an external control device through a connector 20. Illustration of a device for cooling the tip electrodes 8 and 9 is omitted.

The position detector 2 is a phase-shift type detector detecting the amount of displacement of the cylinder rod 11 by a coil assembly 21 and the specially processed cylinder rod 11. This position detector 2 detects the distance between the tip electrodes 8 and 9 indirectly, by detecting the amount of displacement of the cylinder rod 11. This position detector is described in detail in Japanese Utility Model Laid-open Publication No. 57-135917, 58-136718, or 59-175105, U.S. Pat. No. 4,804,913 and European Patent No. 0212628. Packings 22 and 23L are provided on both sides of the coil assembly 21 for sealing off air of the pressing cylinder 1. Various data for position detection are applied to or provided from the coil assembly 21 through the connector 12.

Pressurized air from an air pressure source 49 is introduced into ports 13, 14 via an electromagnetic valve (direction switching valve) 48. Thus, in this pressing cylinder 1, a piston 15 in a cylinder tube 18 is pressed by the air pressure introduced through the ports 13, 14 so that the cylinder rod 11 is moved to open or close the gap between the electrodes 8, 9. The opening or closing of the gap between the electrodes 8, 9 is made by the action of the direction switching valve 48. The piston 45 is fastened onto the cylinder rod 11 by a nut 16, and an O-ring 17 is provided around the piston 15 for sealing purpose. Although not shown, similar sealing O-rings are provided on both sides of the cylinder tube 18. The pressing cylinder 1 is substantially identical in construction with the prior art pressing cylinders 1 except for the cylinder rod 11.

The brake unit 30 serves to brake the cylinder rod 11 by a frictional force produced between the pressing cylinder 1 and the cylinder rod 11. An electromagnetic valve (control valve) 47 performs control as to whether or not the brake unit 30 should brake the cylinder rod 11. Specific structure of the brake unit 30 will be described later.

The present invent ion employs, as a technique for positioning the cylinder rod 11 at a desire position by the use of the brake unit 30, such a technique as disclosed in Japanese Patent Laid-open Publication No. 59-117902. The positioning control technique employed in the present invention will be outlined just briefly since it is described in detail in the publications.

The positioning control technique is characterized by a learning function which permits an accurate positioning in view of a change in the overrun amount corresponding to the moving speed and/or acceleration of the piston 15 (cylinder rod 11). Since it has been found that the initial stage of the piston movement is relatively strongly affected by its acceleration, this positioning control technique performs a positioning control, estimating an overrun amount corresponding not only to the moving speed but also the acceleration.

More specifically, according to this technique, an estimated overrun amount is determined in view of both the moving speed and acceleration of the piston 15 (cylinder rod 11) relative to the cylinder tube 18, and current position data output from the position detector 2 or positioning target value (movement amount setting value) is changed in such a manner that compensation is made in accordance with the estimated overrun amount thus determined, and then the movement amount of the piston 15 (cylinder 11) is controlled on the basis of a comparison with. the changed position data or target value.

A unique feature of the spot welding machine according to this embodiment as compared with the conventional welding machine is that the position detector 2 which detects the amount of displacement of the cylinder rod 11 of the pressing cylinder 1 in an absolute fashion is provided so that the distance between the tip electrodes 8 and 9 is detected from an output of this position detector 2, and that the brake unit is provided which is capable of stopping the cylinder rod 11 at any desired positions. Since the brake unit 30 and the position detector 2 are provided integrally with the pressing cylinder 1 which applies a pressing force to the tip electrodes 8 and 9, the distance between the tip electrodes can be detected in a simple manner without the necessity for modifying the structure of the welding gun, and a desired distance can be maintained between the electrodes 8 and 9 by actuating the brake unit 30 in accordance with the detected interelectrode distance.

Figure 2:
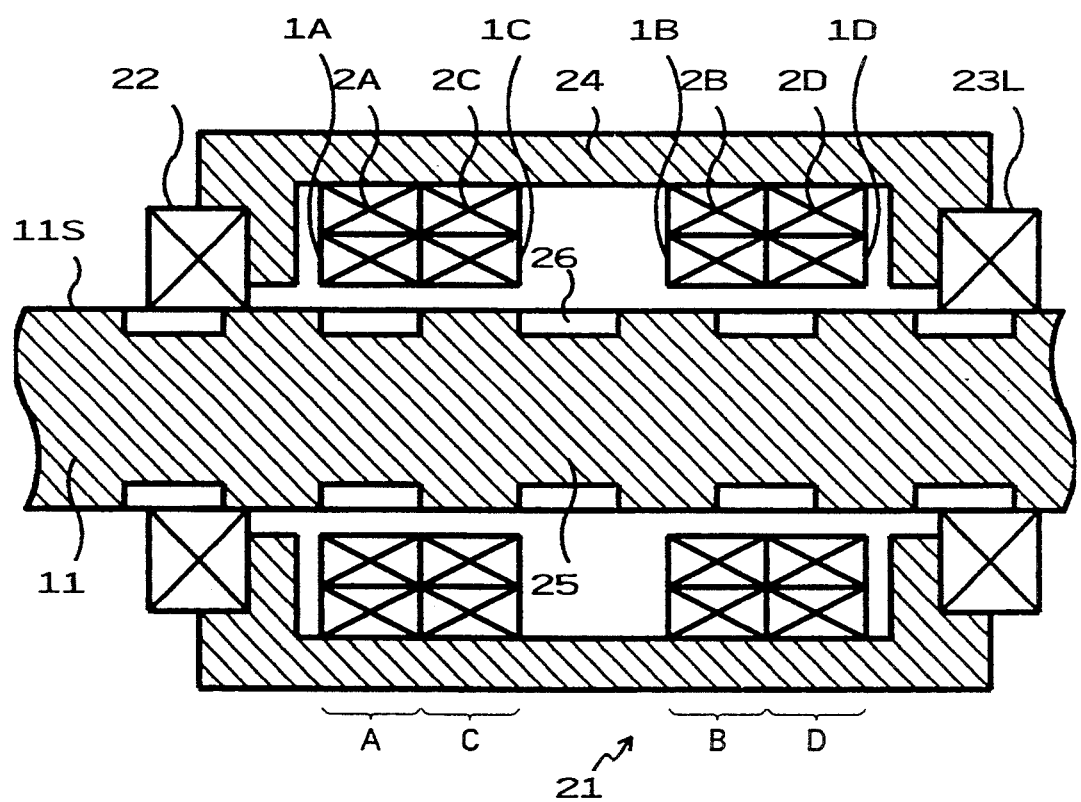
FIG. 2 is a sectional view showing a specific example of position detector shown in FIG. 1.
Figure 3:
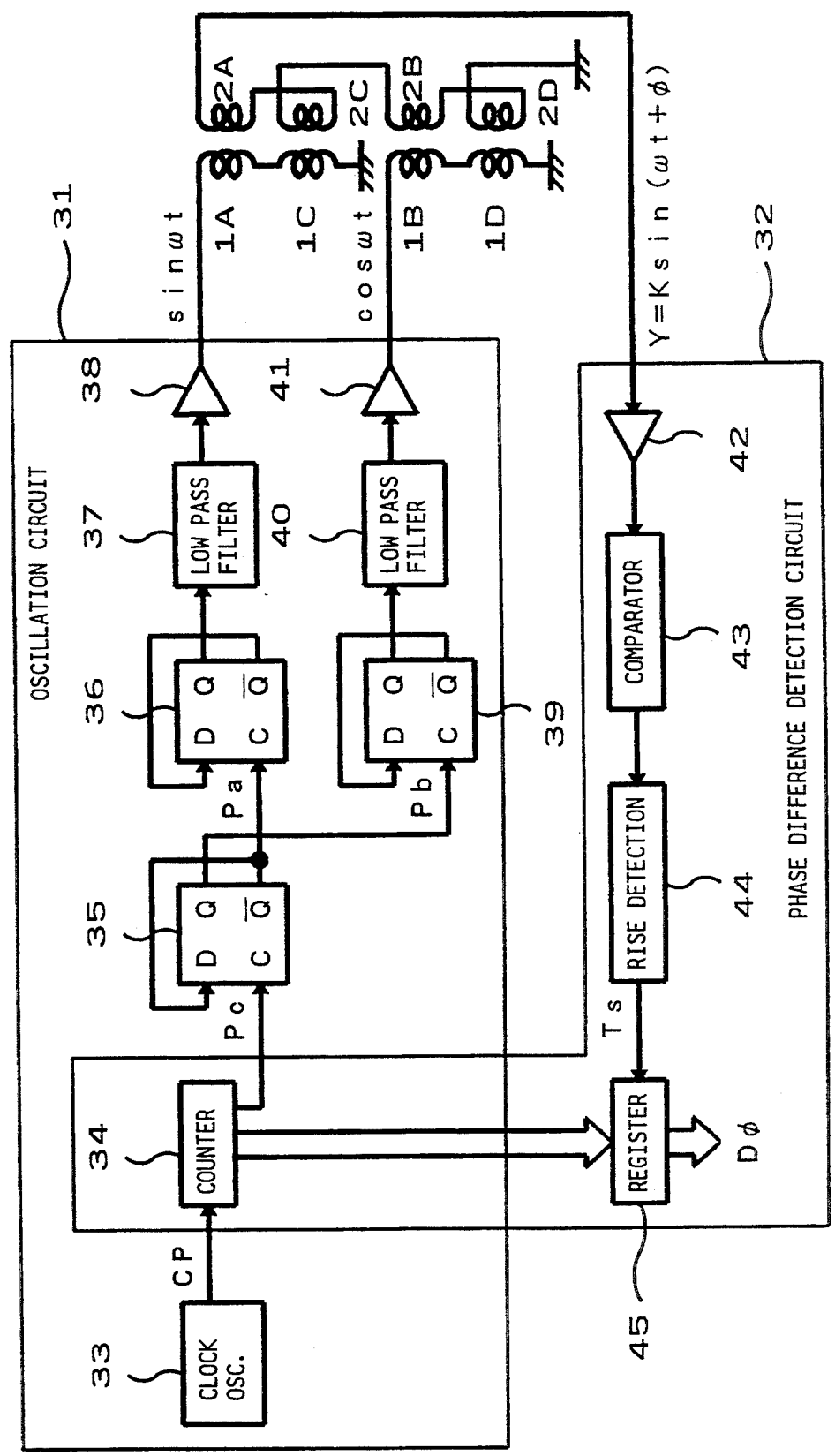
FIG. 3 is a block diagram showing an example of a position data conversion section for converting a detection signal from the position detector in FIG. 1 to a position signal.

Specific examples of the pressing cylinder 1 and the position detector 2 are shown in FIG. 2. The wirings of the coil assembly 21 and construction of a position conversion section of the position detector 2 are shown in FIG. 3.

Since details of the position detector 2 is known from Japanese Utility Model Laid-open Publication No. 57-135917 or 58-136718, or U.S. Pat. No. 4,804,913 or European Patent No. 0212628, an only brief description will be made herein. In FIG. 2, the same components as those in FIG. 1 are designated by the same reference characters and description thereof will be omitted.

The position detector 2 detects a linear position by the phase shift principle and comprises the coil assembly 21 and the cylinder rod 11.

The coil assembly 21 includes four primary coils 1A, 1C, 1B and 1D which are disposed with a predetermined interval therebetween in the axial direction of the cylinder rod 11 and secondary coils 2A, 2C, 2B and 2D which are provided in correspondence to the primary coils 1A, 1C, 1B and 1D. The coil assembly 21 is fixed to a casing 24 so that a cylindrical space formed in the coil assembly 51 is concentrical with the cylinder rod 11.

The cylinder rod 11 comprises a magnetic graduation section 11S provided in the peripheral portion thereof.

The magnetic graduation section 11S is composed of a magnetic substance portion 25 and annular non-magnetic substance portions 26 of a predetermined length which are provided alternately with the magnetic substance portion 25 in the axial direction of the cylinder rod 11. These magnetic substance portion 25 and non-magnetic substance port ions 26 may be made of any materials so long as they can provide reluctance change to a magnetic circuit formed in the coil assembly 21. For example, the non-magnetic substance portions 26 may be made of a non-magnetic substance or air. Alternatively, by causing change in magnetic property by applying laser baking to the rod 11 made of iron, the magnetic substance portion 25 and non-magnetic substance portions 26 may be alternately formed.

Assuming, for example, that the length of one coil is "P/2" (P being any number), the interval for one pitch in the alternate arrangement of the magnetic substance portion 25 and the non-magnetic substance portions 26 is equally "P". In that case, the length of the magnetic substance portion 25 and the length of the non-magnetic substance portion 26 may be equally "P/2" or may not be equal.

In the present embodiment, the coil assembly 21 is so constructed that it is operated with four phases. For convenience of explanation, these phases will be distinguished from one another by using reference characters A, B, C and D.

The positional relation between the cylinder rod 11 and the coil assembly 21 is so arranged that reluctance produced in the respective phases A to D of the coil assembly 21 is shifted by 90 degrees in accordance with the position of the magnetic substance portion 25 of the cylinder rod 11. If, for example, the phase A is a cosine (cos) phase, the phase C will be a minus cosine ($-\cos$) phase, the phase B a sine (sin) phase and the phase D a minus sine ($-\sin$) phase, respectively.

In the example of FIG. 2, the primary coils 1A, 1C, 1B and 1D and the secondary coils 2A, 2C, 2B and 2D are provided for the respective phases A to D. The secondary coils 2A, 2C, 2B and 2D of the respective phases A to D are wound on the outside of the primary coils 1A, 1C, 1B and 1D.

The length of the primary coils 1A, 1C, 1B and 1D and the length of the secondary coils 2A, 2C, 2B and 2D are "P/2" as described above. In the example of FIG. 2, the coils 1A and 2A of the phase A are provided adjacent to the coils 1C and 2C of the phase C and the coils 1B and 2B of the phase B are provided adjacent to the coils 1D and 2D of the phase D. The interval between the coils of the phase A and the coils of the phase B or the interval between the coils of the phase C and the coils of the phase D is "P ($n\pm\frac{1}{4}$)" (n being any natural number).

According to this construction, reluctance of the magnetic circuit in the respective phases A to D changes periodically with the distance "P" being one period in accordance with the linear displacement of the cylinder rod 11 and, moreover, the phase of reluctance change can be shifted by 90 degrees for each of the phases A to D. Accordingly, there is phase difference of 180 degrees between the phase A and the phase C and also between the phase B and the phase D.

Connections between the primary coils 1A, 1C, 1B and 1D and the secondary coils 2A, 2C, 2B and 2D are shown in FIG. 3. In FIG. 3, connection is made so that the primary coils 1A and 1C of the phases A and C are excited in the same phase by a sine signal $\sin \omega t$ and outputs of the secondary coils 2A and 2C are added together in opposite phases. Similarly, connection is made so that the primary coils 1B and 1D are excited in the same phase by a cosine signal cos ωt and outputs of the secondary coils 2B and 2D are added in opposite phases. Outputs of the secondary coils 2A, 2C, 2B and 2D are finally added together and loaded into a phase difference detection circuit 32 as an output signal Y.

This output signal Y is equal to a signal obtained by phase-shifting a reference ac signal (sin ωt, cos ωt) by a phase angle $\phi$ corresponding to linear position of the magnetic substance portion 25 in the cylinder rod 11. This is because reluctance of the phases A to D is different in phase by 90 degrees and the electric phase of one pair (A, C) of the coils is different by 90 degrees from that of the other pair (B, D). Therefore, the output signal Y is Y=K sin (ωt+$\phi$) (where K is a constant).

The phase of the reluctance change is proportional to the linear position of the magnetic substance portion 25 in accordance with a predetermined proportion coefficient (or function) and, therefore, the linear position can be detected by measuring the phase difference $\phi$ from the reference signal sin ωt (or cos ωt) in the output signal Y. However, when the phase difference amount $\phi$ is a full angle 2π, the linear position corresponds to the above described distance P. In other words, an absolute linear position within the range of the distance P can be detected by the electrical phase difference amount $\phi$. By measuring this electrical phase difference amount $\phi$, the linear position within the range of the distance P can be detected accurately with a considerably high resolution.

The magnetic graduation section 11S in the rod 11 may be made of not only the magnetic substance portion 25 and the non-magnetic substance portions 26 but other materials which can produce reluctance change. For example, the magnetic graduation section 11S may be made of a combination of a highly conductive material such as copper and a relatively low conductive material such as iron (or non-conductive material), i.e., a combination of materials of different conductivity to produce reluctance change corresponding to eddy current loss. In that case, a pattern of a conductive material may be formed by copper plating, for example, on the surface of the rod 11 made, for example, of iron. The pattern may be of any shape as long as it can produce reluctance change effectively.

Means for detecting the phase difference amount $\phi$ between the output signal Y and the reference signal sin ωt (or cos ωt) may be constructed in any suitable manners. FIG. 3 shows an example of a circuit which obtains this phase difference amount $\phi$ in a digital amount.

In FIG. 3, an oscillation section 31 is a circuit which produces a reference sine signal sin ωt and a reference cosine signal cos ωt and a phase difference detection circuit 32 is a circuit which measures the phase difference amount $\phi$.

A clock pulse CP provided by a clock oscillator 33 is counted by a counter 34. The counter 34 is, for example, of modulo M and a counted value of the counter 34 is supplied to a register 45. A pulse Pc derived by frequency-dividing the clock pulse CP by 4/M is provided from an output derived by frequency-dividing the counted value of the counter 34 by 4/M and is supplied to a C input of a flip-flop 35 for ½ frequency dividing.

A pulse Pb which is provided from an output Q of the flip-flop 35 is applied to a flip-flop 39 and a pulse Pa which is provided from an inverted output *Q (* means inversion) of the flip-flop 35 is applied to a flip-flop 36. Outputs of the flip-flops 36 and 39 are supplied as the sine signal sin ωt and the cosine signal cos ωt to the coil assembly 21 through low-pass filters 37 and 40 and amplifiers 38 and 41.

A count M in the counter 34 corresponds to a phase angle of 2π radian of these reference signals sin ωt, cos ωt. In other words, one count of the counter 34 represents a phase angle of 2π/M radian.

The output signal Y of the coil assembly 21 is applied to a comparator 43 through an amplifier 42 and a square wave signal corresponding to a positive or negative polarity of the output signal Y is provided by the comparator 43. Upon rising of the output signal of the comparator 43, a pulse Ts is produced by a rise detection circuit 44 and the count of the counter 34 is written into a register 45 in response to this pulse Ts. As a result, a digital value D$\phi$ corresponding to the phase difference amount $\phi$ is loaded into the register 45. The linear position of the cylinder rod 11 can thereby be detected accurately in an absolute value.

Figure 4:
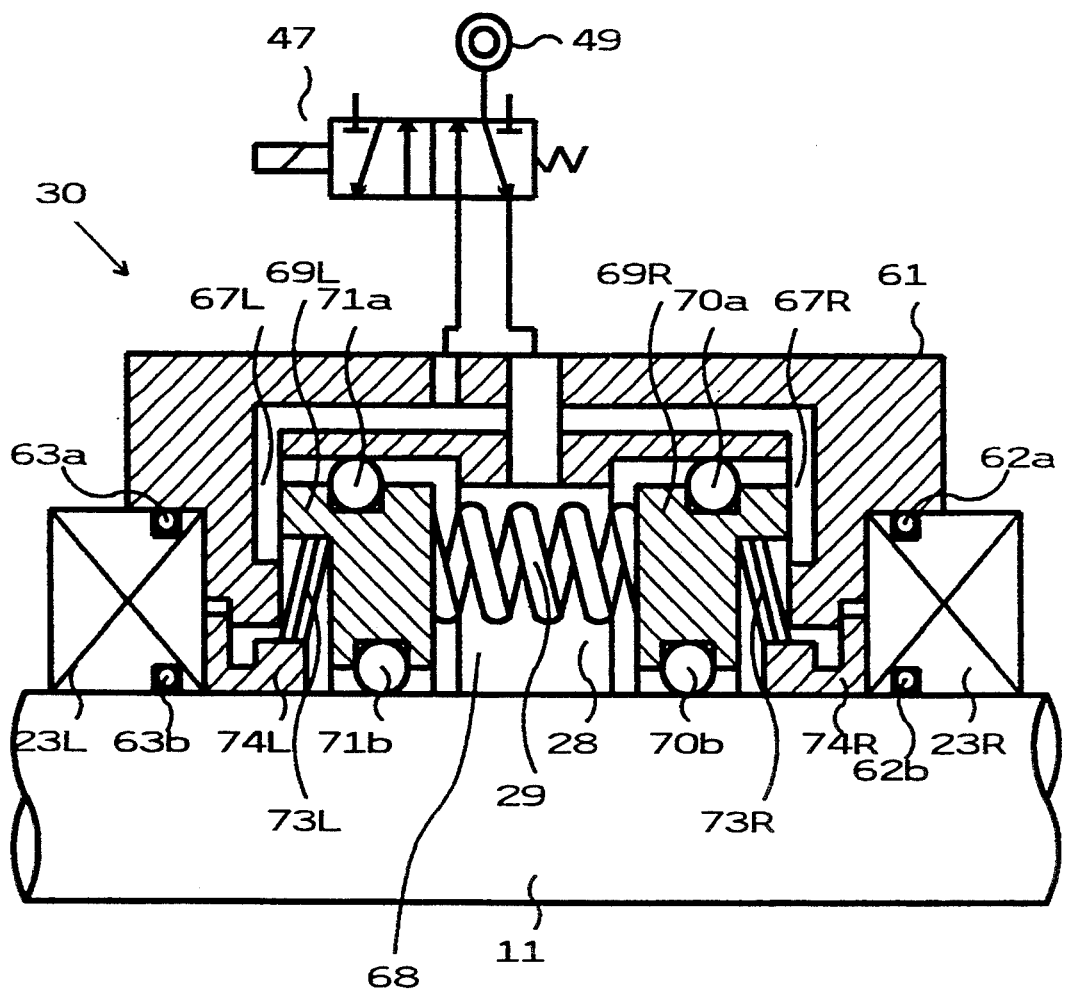
FIG. 4 is a cross sectional view illustrating the brake unit shown in FIG. 1.

FIG. 4 illustrates the specific structure of the brake unit unit 30. In this figure, only the upper portion of the brake unit 30 is shown, and the lower portion is not shown for simplicity since the lower portion is symmetrical with respect to the upper portion about the cylinder rod 11. The brake unit 30 comprises a brake mechanism operated entirely by air pressure. Details of the brake unit 30 are known from Japanese Utility Model Laid-open Publication Nos. 59-13731 and 63-35826 and therefore will be described only briefly.

A cylindrical casing 61 is provided around the cylinder rod 11 which, in this brake unit 30, functions as a brake rod. On both ends of the casing 61 are provided bearings 23L and 23R each of which is slidable along the cylinder rod 11. The bearings 23L, 23R have packing members 62a, 62b and 63a, 63b, respectively, for securing air tightness in the casing 61.

The casing 61 includes piping for supplying air chambers 67L, 67R and 68 with pressurized air from the air pressure source 49 via the electromagnetic valve (brake valve) 47.

Brake pistons 69L and 69R, which are in contact with the casing 61 via packing members 70a, 71a and with the cylinder rod 11 via packing members 70b, 71b, are slidable along the axis of the cylinder rod 11. The air chambers 67L, 67R and 68 are jointly defined by the brake pistons 69L, 69R and the casing 61.

A plurality of coil springs (only one is shown) 72 are provided around the outer periphery of the cylinder rod 11 in the air chamber 68 defined between the brake pistons 69L, 69R. The coil springs 72 are normally biased to push the brake pistons 69L, 69R away from each other in the axial direction of the cylinder rod 11.

Each of brake bushes 74L, 74R comprises a C-shaped bush with a plurality of slots. In the normal state (where no outer force is applied), the brake bushes 74L, 74R are free to move along the peripheral surface of the cylinder rod 11.

Cone-shaped springs 73L, 73R are provided around the respective brake bushes 74L, 74R. The inner peripheral portions of the cone-shaped springs 73L, 73R are in contact with the outer peripheral surfaces of the corresponding brake bushes 74L, 74R, while the outer peripheral portions of the springs 73L, 73R are in contact with the inner peripheral portions of the brake pistons 69L, 69R. Thus, as the distances between the brake bushes 74L, 74R and the brake pistons 69L, 69R become smaller, the outer peripheral portions of the cone-shaped springs 73L, 73R are opened wider in such a manner that inward radial force is applied to the brake bushes 74L, 74R from the corresponding cone-shaped springs 73L, 73R, and thereby the outer peripheral portions of the brake bushes 74L, 74R are compressed. As the result, the inner surfaces of the brake bushes 74L, 74R are caused to grip the cylinder rod 11 to provide a frictional braking force thereto.

Conversely, when the distances between the brake bushes 74L, 74R and the brake pistons 69L, 69R become greater, the cone-shaped springs 73L, 73R resiliently restore their original states boy shapes, so that no force is applied any longer from the springs 73L, 73R to the brake bushes 74L, 74R and therefore such a force compressing the outer peripheral portions of the brake bushes disappear. As the result, the inner surfaces of the brake bushes 74L, 74R are disengaged from the cylinder rod 11 to withdraw the braking force therefrom.

When the air pressure source 49 is in the OFF state, the brake pistons 69L, 69R are pushed apart in the axial direction of the cylinder rod 11, and the cone-shaped springs 73L, 74R are pressed against the inner surface of the casing 61 by the brake pistons 69L, 69R. Because of the inner diameter of the pressed cone-shaped springs 73L, 73R, the brake bushes 74L, 74R are in turn pressed into contact with the cylinder rod 11. Thus, due to the frictional force between the brake bushes 74L, 74R, the brake unit 30 is brought into its braking state. Therefore, even when the air pressure source 49 is in the OFF state, the brake unit 30 is maintained in the self-locking (braking) state.

On the other hand, when the air pressure source 49 is in the ON state, control is made of establishment/release of the braking function of the unit 30 through the ON/OFF action of the electromagnetic valve 47. When the electromagnetic valve 47 is in the OFF state as shown in FIG. 4, pressurized air is introduced into the air chamber 68 and the pressure in the air chambers 69L, 69R equals the environmental pressure. Therefore, the brake pistons 69L, 69R are subjected not only to the biasing force of the coil springs 72 but also to the pressure of the pressurized air introduced into the air chambers 69L, 69R. This causes the cone-shaped springs 73L, 73R to be pressed against the inner surface of the casing 49 with a greater force than when the air pressure source 49 is in the OFF state, and thereby the braking state of the brake unit 30 can be made more firm.

Conversely, when the electromagnetic valve 47 is in the ON state, pressurized air is introduced into the air chambers 69L, 69R and pressure in the air chamber 69 equals the environmental pressure. Therefore, pressure of the pressurized air introduced into the air chambers 69L, 69R is applied to the brake pistons 69L, 69R in such a direction as to cancel the biasing force of the coil spring 72. So, the brake pistons 69L, 69R are moved closer to each other by the pressure of the pressurized air. Then, the pressing force having been applied to the cone-shaped springs 73L, 73R is removed, and thus the cone-shaped springs 73L, 73R cause the brake bushes 74L, 74R to be disengaged from the brake rod 22. As the result, the braking state of the brake unit 30 is cleared so that it is free to move along the brake rod 22.

Next, description will be made about the positioning control system of the spot welding machine shown in FIG. 1.

Figure 5:
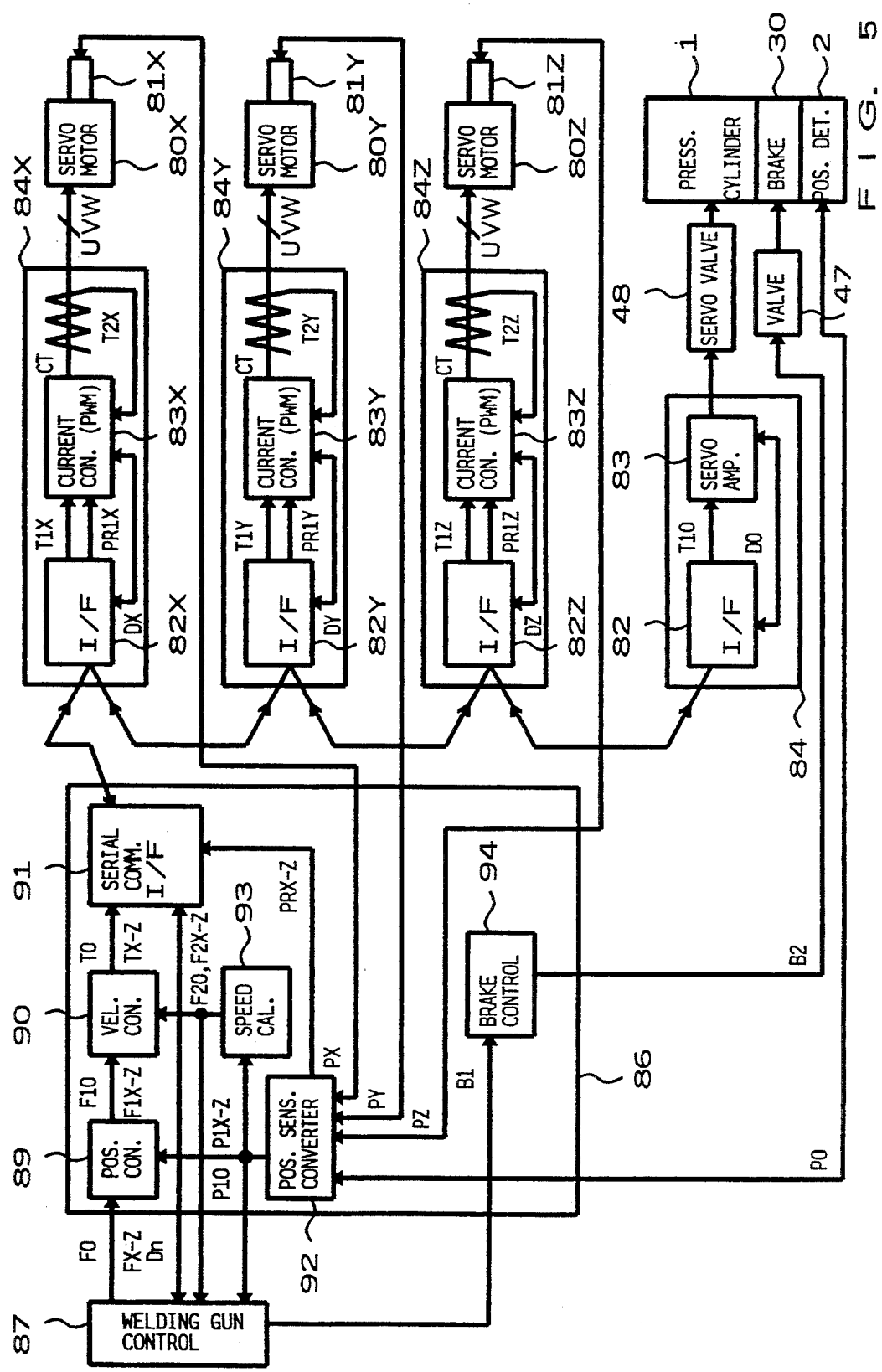
FIG. 5 is a block diagram illustrating a general structure of a position control system for controlling the positioning of the spot welding machine of FIG. 1 in three dimensional space.

FIG. 5 is a block diagram illustrating the general structure of the positioning control system of the spot welding machine. In the illustrated example, the spot welding machine is controllably positioned in three dimensional space by means of three servomotors 80X, 80Y, 80Z.

A welding gun control section 87 controls the entire operation of the positioning control system, and it provides a position control section of a position/speed control section 86 with position instruction signals FX, FY, FZ indicative of respective target positions of the servomotors 80X, 80Y, 80Z and a position instruction signal F0 indicative of the interelectrode distance of the welding machine.

Further, the welding gun control section 87 is coupled to a serial communication interface 91 so that various data Dn from the control section 87 are output to current control sections 84X, 84Y, 84Z and an electromagnetic valve control section 84 via serial communication interfaces 91, 82X, 82Y, 82Z, 82. Via the serial communication interfaces 91, 82X, 82Y, 82Z, 82, various data are also input from the current control sections 84X, 84Y, 84Z and electromagnetic valve control section 88 to the welding gun control section 87.

Moreover, the welding gun control section 87 receives from a position sensor converter section 92 position data P10 indicative of the current value of the interelectrode distance in the spot welding machine, and it also provides a brake control section 94 with a coincidence signal B1 when the position instruction signal F0 has coincided with the position data P10. In addition, the welding gun control sect ion 87 receives the position data P10 from the position sensor converter section 92 and always compares the input position data P10 with a predetermined value to monitor whether the tip electrodes are in the opened state or in the closed state. When the position data P10 indicates the "closed state" although the electrodes should in fact be in the opened state, an alarm etc. is sounded to inform an unusual opening/closing action of the tip electrodes.

The position speed control section 86 is composed of the position control section 89, speed control section 90, serial communication interface 91, position sensor converter section 92, speed calculation section 93 and brake control section 94.

The position control section 89 is coupled to the welding gun control section 87 and the position sensor converter section 92, and it inputs therein a position instruction signal F0 indicative of the interelectrode distance of the spot welding machine and position instruction signals FX, FY, FZ indicative of target positions of the servomotors 80X, 80Y, 80Z. The position control section 89 also inputs therein position data P10 indicative of the current value of the interelectrode distance of the spot welding machine and position data P1X, P1Y, P1Z indicative of respective positions of the servomotors 80X, 80Y, 80Z.

The position control section 89 is coupled to the speed control section 90, and it calculates deviations between the position instruction signals F0, FX, FY, FZ and the position data P10, P1X, P1Y, P1Z and then outputs to the speed control section 90 speed instruction signals F10, F1X, F1Y, F1Z corresponding to the calculated positional deviations. Further, the position sensor converter section 92 generates phase signals PRX, PRY, PRZ for controlling the field system switching position of the servomotors 80X, 80Y, 80Z. The thus generated phase signals PRX, PRY, PR are output to the serial communication interface 91.

The speed control section 90 is connected to the position control section 89 speed calculation section 93 and serial communication interface 91, and it inputs therein the speed instruction signals F10, F1X, F1Y, F1Z given from the position control section 89, speed signal F20 indicative of the moving speed of the tip electrodes 8, 9 of the spot welding machine and speed signals indicative of the current speeds of the servomotors 80X, 80Y, 80Z. These speed signals F20, F2X, F2Y, F2Z are obtained from the speed calculation section 93 which converts the position data P10, P1X, P1Y, P1Z provided from the position sensor converter section 92. The speed calculation section 93 inputs therein the position data P10, P1X, P1Y, P1Z from the position sensor converter section 92 and calculates the moving speed of the tip electrodes 8, 9 and rotation speeds of the servomotors by digital arithmetic operations based on the position data change amounts per predetermined unit time. The thus calculated speeds are output to the speed control section 90 as speed signals F20, F2X, F2Y, F2Z.

The speed control section 90, which is connected to the serial communication interface 91, calculates speed deviations between the speed instruction signals F10, F1X, F1Y, F1Z and the speed signals F20, F2X, F2Y, F2Z and then provides the communication interface 91 with current instruction signals (torque signals) corresponding to the calculated speed deviations.

The serial communication interface 91 is connected to the welding gun control section 87, speed control section 90 and position sensor converter section 92. Via a communication line, the interface 91 transmits the current instruction signals or torque signals given from the speed control section 90 to the serial communication interfaces 82, 82X, 82Y, 82Z of the electromagnetic valve control 84 and the current control sections 84X, 84Y, 84Z.

Moreover, via the communication line, the serial communication interface 91 transmits the phase signals PRX, PRY, PRZ given from the position sensor converter section 92 to the serial communication interfaces 82X, 82Y, 82Z. The serial communication interface 91 and the individual communication interfaces 82, 82X, 82Y, 82Z are multipoint-connected via the communication line which is a bidirectional line, so that various data Dn from the welding gun control section 87 and data D0, DX, DY, DZ generated in the electromagnetic valve control section 84 and current control sections 84X, 84Y, 84Z are exchanged between the welding gun control section 87 and the electromagnetic valve control section 84 and current sections 84X, 84Y, 84Z.

The electromagnetic valve control section 84 is composed of the serial communication interface 82 and a servo amplifier 83.

The serial communication interface 82, which is connected to the serial communication interface 91 of the position speed control section 86 and to the servo amplifier 83, receives via the serial communication interfaces 82X, 82Y, 82Z, the current instruction signal T0 and outputs the signal to the servo amplifier 83 as a current instruction signal T10. The serial communication interface 8 also transmits to the serial communication interface 91 various data D0 which include a status signal indicative of the controlled conditions in the servo amplifier 83.

The servo amplifier 83, which is connected to the serial communication interface 82 and a servo valve 48, inputs therein the current instruction signal T10 and drives a power transistor to provide driving current to the servo valve 48. The servo valve 48, in response to the driving current, successively controls the magnitude and direction of the air pressure flowing into the pressing cylinder 1 and also controls a moving speed of the cylinder rod 11 of the pressing cylinder 1. In this respect, the servo valve 48 is greatly different from a mere direction switching valve as shown in FIG. 1.

Further, the serial communication interface 82 and servo amplifier 83 are interconnected via data lines in such a manner that various data D0 may be exchanged between the two components 82 and 83.

The servo amplifier 83 contains a memory for storing a variety of data such as status data indicative of the controlled status of the servo valve 48, ID code indicative of the rating of the servo amplifier 83 and rating code indicative of the servo valve 48 which is a control target of the system. When required, the data stored in the memory are transmitted, as data D0, to the welding gun control section 87 via the data lines and serial communication interfaces 82, 82Z, 82Y, 82X, 91.

The above-mentioned brake control section 94 is connected to the welding gun control section 87 and electromagnetic valve (brake valve) 47. As described previously, the welding gun control section 87 outputs the coincidence signal B1 to the brake control section 94 when the position data P10 indicative of the current value of the interelectrode distance given from the position sensor converter 92 has coincided with the position instruction signal F0.

Accordingly, upon receipt of the coincidence signal B1, the brake control section 94 outputs a brake signal (driving current) B2 to the electromagnetic brake valve 47 in order to deenergize the valve 47. The electromagnetic brake valve 47 is thus deenergized by the brake signal B2 as shown in FIG. 1, so that pressurized air from the air pressure source 49 is supplied into the air chamber 68 of the casing 27, and therefore the brake unit 30 is immediately brought into its braking state.

In the above-described manner, positioning control of the electrodes of the spot welding machine is performed. Although description has thus far been made in connection with such a case where the position control section 89 and speed control section 90 operate in a similar manner to the positioning control of a servomotor, the positioning control of the spot welding machine may alternatively be performed in such an arrangement in which the position control section 89 and the speed control section 90 merely determine whether the position data P10 indicative of the current value of the interelectrode distance has coincided with the position instruction signal F0 so that the ON/OFF action of the servo valve 48 is controlled by the resultant coincidence or non-coincidence signal. Or alternatively, the brake control section 94 may control the ON/OFF action of the servo valve 48.

The current control sections 84X, 84Y, 84Z are identical in structure and function with each other, and therefore only the structure and function of the control section 84Z will be described below to avoid unnecessary duplication.

The current control section 84X is composed of the serial communication interface 82X and the current control section 83X.

The serial communication interface 82X, which is connected to the serial communication interface 91 of the position speed control section 86 and also to the current control section 83X, receives the current instruction signal (torque signal) TX and phase signal PRX from the serial communication interface 91, and then outputs the received signals as current instruction signal T1X and phase signal PR1X, and also transmits to the serial communication interface 91 various data such as a status signal indicative of the controlled status of the current control section 83X.

The current control sect ion 83X is coupled to the serial communication interface 82X and also to the servomotor 80X. The control section 83X inputs therein the current instruction signal (torque signal) T1 and the phase signal PR1X, on the basis of which it then generates a three-phase PWM signal to energize a power transistor which in turn supplies a driving current to each phase (U, V and W phases) of the servomotor 80X. At this time, current feedback signals T2X of the current values of the U and V phases are fed back to the current control sect ion 83X through a current detecting isolator CT. The current control section 83X provides the servomotor 80X with driving currents which are obtained by ampiifying the deviations between the current instruction signals (torque signals) T1X and current feedback signals T2X of the individual phases.

The serial communication interface 82X and the current control sect ion 83X are interconnected via data lines in such a manner that various data DX can be exchanged therebetween.

The current control section 83X is capable of detecting such control states as an overload on the servomotor 80X, source voltage drop, overcurrent, overvoltage and overheat. In addition, the current control section 83X has a memory for storing various data such as servo status signals indicative of these control statuses, ID code indicative of the rating of a current amplifier and rating codes of the servomotors which are control targets of the system.

When required, the data stored in the memory of the current control section 83X is transmitted, as the abovementioned data Dn(DX), to the welding gun control section 87 via the data lines and serial communication interface 82X.

The motor rating codes are stored in the above-mentioned memory in the form of a lookup table. Accordingly, each of the current control sections 84X, 84Y, 84Z and the electromagnetic valve control section 84 determine whether or not the transmitted data is directed to their own station. If the data is directed to their own station, they read the data and perform controls corresponding to the data. If, for example, the data is concerned with the servomotor drive, they supply driving current to the servomotor on the basis of the data. If table numbers indicative of the servomotor ratings are transmitted, then driving currents of the current control sections 83X, 83Y, 83Z are changed in correspondence with the table numbers over to currents corresponding to the servomotor ratings.

According to the embodiment so far described, the current control sections 83X, 83Y, 83Z can be adjusted to be able to control the servomotors of different ratings merely by selecting the table numbers corresponding to the ratings of the servomotors 80X, 80Y, 80Z. Consequently, even when any of the servomotors is replaced with another, the current control section can be adjusted to correspond to the servomotor merely by changing the table numbers.

Further, according to the present embodiment, the current instruction signals (torque signals) T0, TX, TY, TZ, phase data PRX, PRY, PRZ and various data Dn can simultaneously be transmitted from the serial communication interface 91 to the serial communication interface 82 of the electromagnetic valve 84 and also to the serial communication interfaces 82X, 82Y, 82Z of the current control sections 84X, 84Y, 84Y, so that it is allowed to simultaneously control the servo valve 48 and the servomotors 80X, 80Y, 80Z. In other words, because the axes of the servo motors 80X, 80Y, 80Z correspond to the X, Y and Z axes, it is also made possible to perform linear, arcuate interpolations etc. in three dimensional space.

Next, description will be made on the operation of the welding gun control system according to the embodiment of the invention.

First, the welding gun control system as shown in FIG. 5 is constructed. Then, data Dn (DX, DY, DZ) of table numbers indicative of the ratings of the servomotors 80X, 80Y, 80Z are transmitted from the welding gun control section 87 to the serial communication interfaces 82X, 82Y, 82Z of the current control sections 84X, 84Y, 84Z, via the serial communication interface 91. From the serial communication interfaces 82X, 82Y, 82Z, the table number data are further transmitted to the current control sections 83X, 83Y, 83Z, which in turn identify the ratings of the servomotors 80X, 80Y, 80Z and then function as current control sections corresponding to the identified ratings.

The welding gun control section 87 outputs to the position control section 89 a position instruction signal F0 indicative of the interelectrode distance of the spot welding machine, as well as position instruction signals FX, FY, FZ indicative of the target positions of the servomotors 80X, 80Y, 80Z. The position control section 89 outputs to the speed control section 90 speed instruction signals F10, F1X, F1Y, F1Z that are based on the position instruction signals FX, FY, FZ received from the welding gun control section 87 and position data P10, P1X, P1Y, P1Z. The speed control section 90 outputs to the serial communication interface 91 electric current instruction signals (torque signals) T0, TX, TY, TZ that correspond to the speed instruction signals F10, F1X, F1Y, F1Z and speed signals F20, F2X, F2Y, F2Z.

Then, transmission is made between the serial communication interface 91 and the serial communication interface 82X, 82Y, 82Z, 82, from which electric current instruction signals (torque signals) T1X, T1Y, T1Z, T10 and phase signals PR1X, PR1Y, PR1Z are provided to the current control sections 83X, 83Y, 83Z and the servo amplifier 83. The servo amplifier 83 controls the driving current for the servo valve 48. The current control sections 83X, 83Y, 83Z control the driving current for the respective servomotors 80X, 80Y, 80Z on the basis of the electric current instruction signals (torque signals) T1X, T1Y, T1Z, T10 and the phase signals PR1X, PR1Y, PR1Z.

Output signals PX, PY, PZ of rotational position detection devices 81X, 81Y, 81Z that are connected to the servomotors 80X, 80Y, 80Z, respectively, are fed back to the position sensor converter section 92. Output signal P0 of the position detector 2 of the spot welding machine is also fed back to the position sensor converter section 92. Then, position data P10, P1X, P1Y, P1Z output from the position sensor converter section 92 are fed back to the position control section 89 to form a position loop. Speed signals F20, F2X, F2Y, F2Z are fed back to the speed control section 90 to form a speed loop.

The welding gun control section 87 repeats the above-mentioned operation to control the rotation of the servomotors 80X, 80Y, 80Z for controlling the position of the spot welding machine, and to control the operations of the servo valve 48 and electromagnetic valve (brake valve) 47 for performing a positioning control of the interelectrode distance of the spot welding machine.

When there occurs an unusual condition such as an overload, source voltage drop, overcurrent, overvoltage and overheat in the course of the controls, data of a status signal indicative of such an unusual condition is transmitted to the welding gun control section 87 via the serial communication interfaces 91, 82X, 82Y, 82Z, 82. The welding gun control section 87 then executes processings in accordance with the status data.

Next, relations between the positioning control of the spot welding machine and the interelectrode distance control will be described with reference to FIG. 6 which is a timing chart illustrating the relation between the position data P0 indicative of the interelectrode distance and the current position data PX, PY, PZ indicative of the current positions of the servomotors 80X, 80Y, 80Z, In FIG. 6, the horizontal axes represent time t, and the vertical axes represent the amplitudes of the respective position data.

At time point 0, the interelectrode distance of the welding machine has the maximum value. As the position instruction signals FX, FY, the welding gun control section 87 outputs "PXa" and "PYa" to the position control section 89 in order to actuate the servomotors 80X, 80Y, so that the spot welding machine is caused to move to position "PXa" in the X axis direction and to position "PYa" in the Y axis direction. Then, at time point t1 when the movement of the spot welding machine has been completed, the welding gun control section 87 outputs to the position control section 89 "Pb" as the position instruction signal F0. In response to this, the servo valve 48 is actuated, and thereby the interelectrode distance P0 begins getting smaller. Next, at time point t2 when the interelectrode distance has reached "Pb", the welding gun control section 87 outputs the coincidence signal B1 to the brake control section 94, which in turn outputs the brake signal B2 to the electromagnetic signal (brake valve) 49. Consequently, the cylinder rod 11 of the spot welding machine is caused to stop moving by the braking action of the brake unit 30 so that the interelectrode distance is set to "Pb".

At a predetermined time after the interelectrode distance has been set to "Pb", the welding gun control section 87 outputs to the position control section 89 a logic "0" as the position instruction signal F0. Thereupon, the pressing cylinder 1 attempts to move one of the tip electrodes to position "0". However, because plate workpieces are present between the tip electrodes, the tip electrodes come into contact with the plate workpieces and hold them therebetween at time point t3. At this time point, the interelectrode distance is "Pa" that is equivalent to the thickness of the plate workpieces. Then, a spot welding operation is performed between time points t3 and t4.

When the spot welding operation has been completed at time point t4, the welding gun control section 87 provides the position control section 89 with "Pb" as the position instruction signal F0. Since "Pb" is greater than "Pa", the servo valve 48 is, at this time, caused to operate in the opposite manner so as to increase the interelectrode distance P0. Next, at time point t5 when the interelectrode distance has reached "Pb", the welding gun control section 87 outputs the coincidence signal B1 to the brake control section 94. In response to this, the brake control section 94 outputs the coincidence signal B2 to the electromagnetic valve (brake valve) 47 so that the cylinder rod 11 is caused stop moving by the braking action of the brake unit 30. By stopping the cylinder rod 11, the interelectrode distance becomes "Pb".

Then, while the interelectrode distance is being maintained at "Pb", the welding gun control section 87, at this time, provides the position control section 89 with "PZa" as the position instruction signal FZ so that the servo motor 80Z is actuated to move the spot welding machine to position "PZa" in the Z axis direction. When the movement of the spot welding machine in the Z axis direction has been completed, the welding gun control section 87 provides the position control section 89 with "0" as the position instruction signal F0 so that the plate workpieces are held between the tip electrodes. Thereafter, a spot welding operation is performed in a manner similar to the above-mentioned, and the interelectrode distance is again maintained at "Pb". Subsequently, the spot welding operation is performed at positions "PZb", "PZc" in a similar manner.

When the spot welding operations have been completed at time point t5, the welding gun control section 87 outputs to the position control section 89 "Pmax" signal as the position instruction signal F0, in such a manner that the servo valve 48 is actuated to open the arms and to thereby increase the interelectrode distance P0. Then, at time point t7, the interelectrode distance comes to the maximum and is mechanically fixed.

At time point t7 when the interelectrode distance of the welding machine has come to the maximum value, the welding gun control section 87 outputs to the position control section 89 "PXb", "PYb" and "PZb" signals as the position instruction signals FX, FY, FZ, so that the servomotors 80X, 80Y, 80Z are actuated to move the spot welding machine to position "PXb" in the X axis direction, to position "PYb" in the Y axis direction and to position "PZ0 (initial point)" in the Z axis direction. Then, at time point t8 when the movement of the spot welding machine has been completed, the welding gun control section 87 outputs to the position control section 89 "Pb" signal as the position instruction signal F0, so that actions similar to the above-mentioned are made to perform a spot welding operation at positions "PZa", "PZb" and "PZc" in the Z axis direction.

Thus, by temporarily fixing the interelectrode distance at position "Pb", it is allowed to greatly reduce the time required for welding the workpieces at plural spots.

In the event the tip electrodes themselves are undesirably welded to the plate workpieces in the course of the above-described operation, the interelectrode distance will fail to reach the "Pb". So, in such a case, the welding gun control section 87 judges that the tip electrodes are not in the predetermined opened state and then causes the alarm etc. to sound in order to inform operators of the occurrence of the unusual welding conditions.

Figure 7:
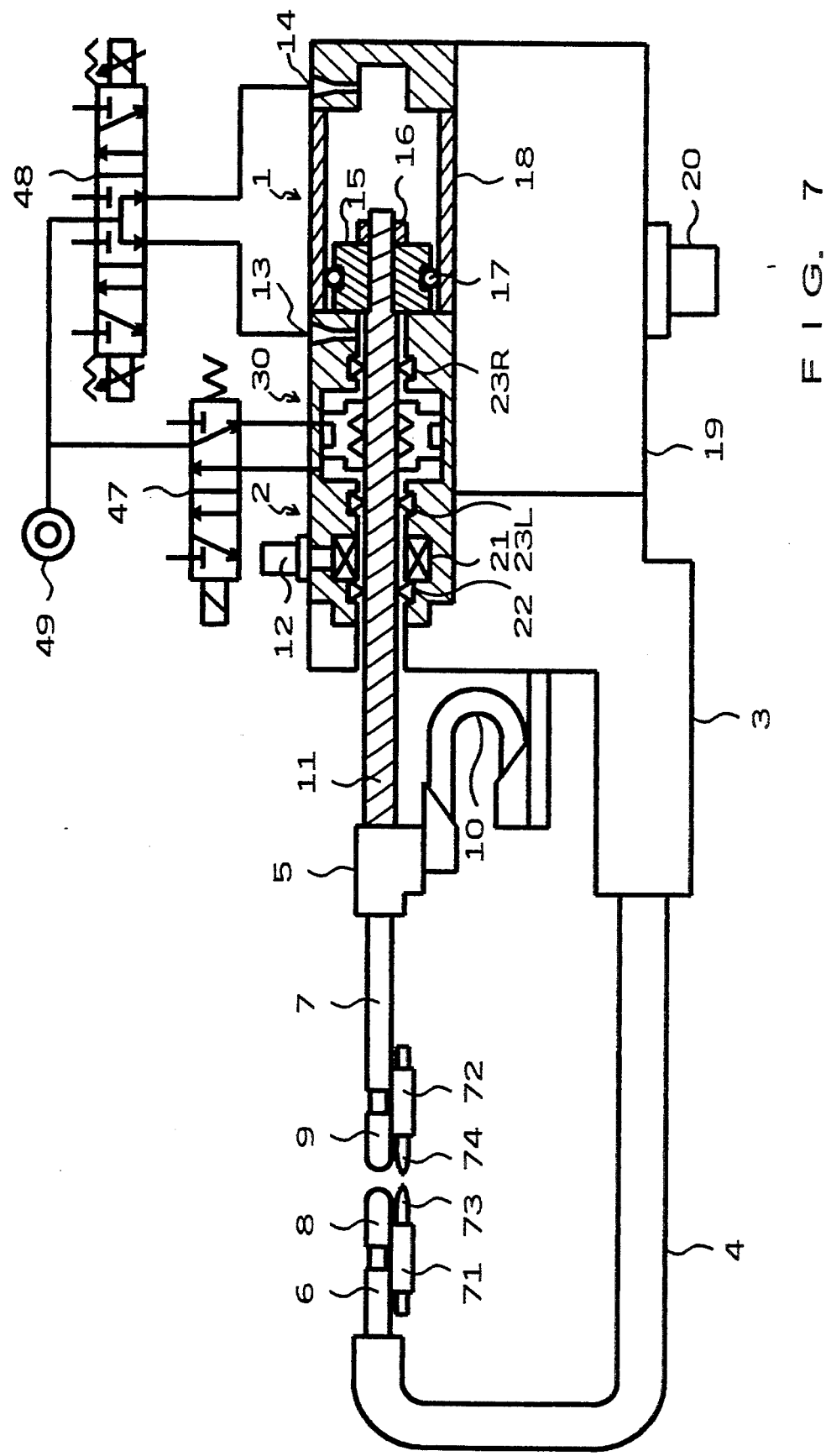
FIG. 7 is a side view, partly in section, showing a modified embodiment of the spot welding machine having the C-shaped welding gun as shown in FIG. 1.

FIG. 7 is a view illustrating a modification of the spot welding machine shown in FIG. 1. In FIG. 7, elements denoted by same reference characters as in FIG. 1 have same structure and function as those in FIG. 1 and therefore will not be described in detail herein.

Welded condition or joint quality of the spot welding is difficult to examine from its external appearance as compared with the gas welding or arc welding, and nondestructive testing approach has not yet been established either for the spot welding although various research and developments etc. have been proposed which are intended for simply achieving the nondestructive testing methods. One of such methods is to examine the joint condition of a welded portion by measuring an interelectrode distance (i.e., thickness of the plate workpieces welded).

The spot welding machine shown in FIG. 1 achieves the advantage that it allows the interelectrode distance to be measured during the welding and it also allows welding operations to be continually performed while the joint condition is being examined.

Namely, a pressing force produced by the pressing cylinder 1 is applied to the tip electrodes 8, 9 via an arm 4 and a movable arm 5 throughout the initial pressing time, the energizing time and the holding time. Change in the distance between the tip electrodes 8, 9 during the energizing time occurs from the fact that pressure opposite to the pressing force results from the energization and this opposite pressure causes the tip electrodes to move in the opposite direction. The opposite pressure resulting from the energization is transmitted through the arms 4 and 5 to the pressing cylinder 1 in such a manner that the cylinder rod 11 of the pressing cylinder 1 is moved in a direction opposite to the pressing direction. On the other hand, during the holding time, the portion to be welded cools down and therefore contracts gradually. Because of this contraction, the cylinder rod 11 is caused to move in the same direction as the pressing direction.

The stroke position of the pressing cylinder 1 varies as the distance between the tip electrodes 8 and 9 varies. Accordingly, in the embodiment of FIG. 1, it is made possible to detect the distance between the tip electrodes 8 and 9 moving during the energization time, by detecting the moved position of the cylinder rod 11 by means of the position detector 2.

The spot welding machine according to the embodiment of FIG. 1 is advantageous when used in such an arrangement where a slight change, in the order of tens of micrometers, of the interelectrode distance occurring during the energization time can reliably be conveyed to the cylinder rod 11 of the pressing cylinder 1 without the arms 4 and 5 being undesirably deformed or bent. Namely, the spot welding machine according to the embodiment of FIG. 1 can accurately detect the distance between the tip electrodes 8 and 9 even during the spot welding operation, as long as the arm support member 3 and the movable arm 4 are so rigid not to be easily deformed by the pressing force of the pressing cylinder 1. However, the spot welding machine of FIG. 1 is not very satisfactory in that, in order to provide such rigid arm support member 3 and movable arm 4, it is necessary to employ rigid materials such as metal of increased diameter, which will increase the manufacturing cost.

If the arm support member 3 and movable arm 4 are not sufficiently rigid, a slight change, in the order of tens of micrometers, of the interelectrode distance occurring during the energization time may be absorbed in the deformation of the support member 3 or arm 4, and thereby the cylinder rod 11 may not accurately move in accordance with the slight change of the interelectrode distance.

In view of the above-mentioned problem, the embodiment shown in FIG. 7 is characterized in that position detectors 71, 72 are provided for detecting an amount of movement of the arm 4 and movable arm 5 relative to the plate workpieces which are caused to move in accordance with the expansion and contraction of the workpieces, so that the distance between the electrodes 8 and 9 may be detected with high accuracy during a spot welding operation. In addition to the position detector 2 as shown in FIG. 1, the spot welding machine of FIG. 7 includes the position detectors 71, 72 which are both of the same structure as the detector 2 and are attached to a holder 6 and a tip electrode 8, and a holder 7 and a tip electrode 9, respectively. These additional position detectors 71, 72 are movable along with the corresponding arms in accordance with the deformation or bend of the arms. By detecting the moved amount of the arms themselves, it is allowed to accurately detect the interelectrode distance during a spot welding operation even when the arms which are not rigid enough are deformed or bent.

Position detecting rods 73, 74 of the position detectors 71 and 72 are in contact with a portion of plates to be joined which does not expand or contract during welding and, therefore, when the position detectors 71 and 72 are moved by movement of the arm 4 due to expansion and contraction of the welded portion of the plates to be joined, the position detection rods 73 and 74 maintain the state of contact with the plates owing to the force of the springs provided therein. This brings about change in the relative positional relation between the coil assembly in the position detectors 71 and 72 and the position detection rods 73 and 74 and the position detectors 71 and 72 can thereby detect the distance between the mounting position of the position detectors 71 and 72 and the plates to be joined which has changed due to expansion and contraction of the plates. By operating (i.e., adding or subtracting) position detection values of the two position detectors 71 and 72 change in the distance between the tip electrodes and 9 can be accurately measured.

Figure 8:
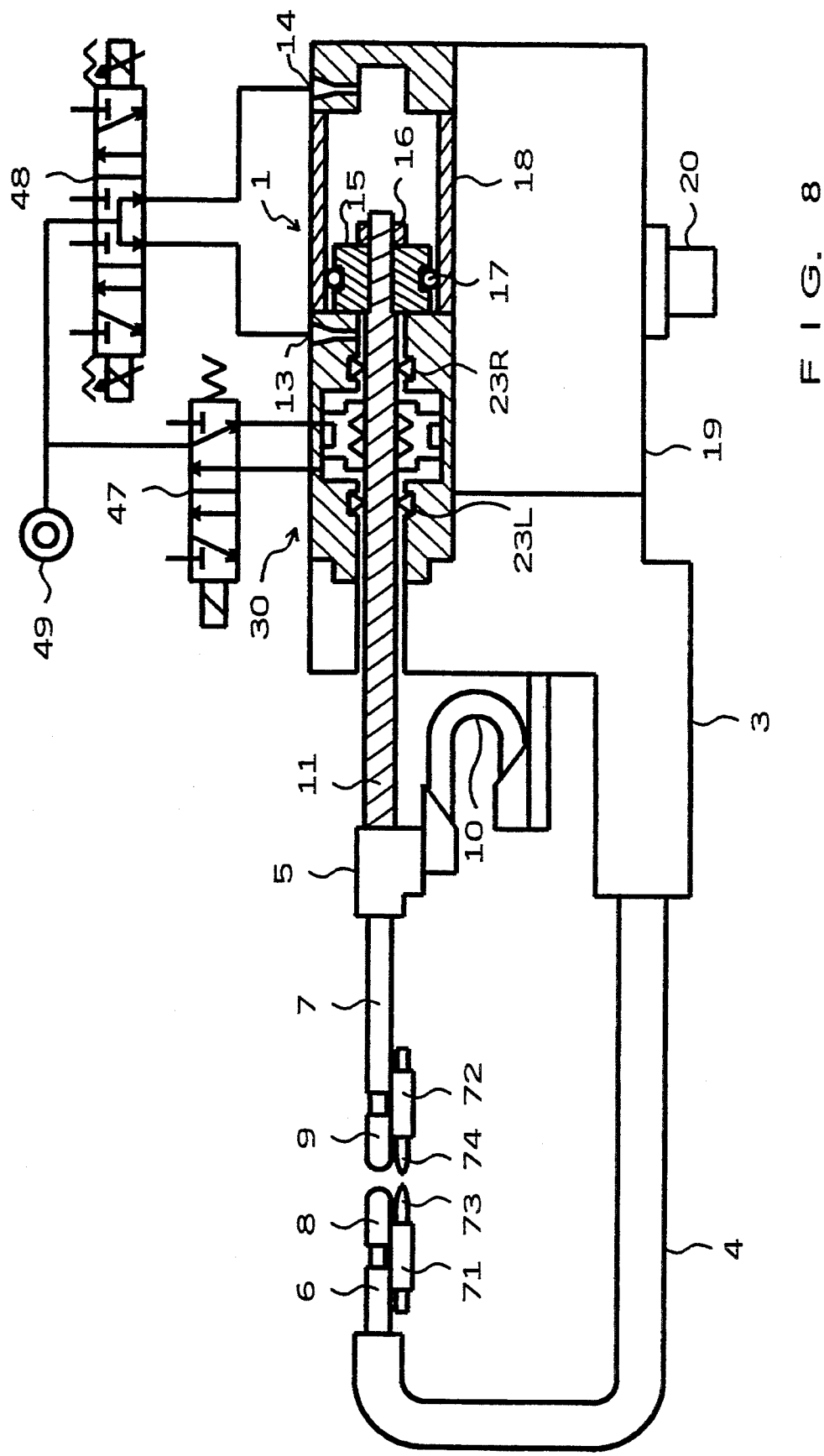
FIG. 8 is a side view, partly in section, showing another modified embodiment of the spot welding machine having the C-shaped arm type welding gun as shown in FIG. 1.

FIG. 8 is a view illustrating still another modified example of the spot welding machine of FIG. 1 elements denoted by the same reference characters as in FIG. 1 will not be described here since they have the same structures and functions as those in FIG. 1.

The spot welding machine of FIG. 8 has no position detector 2 of FIG. 1. Because most of the braking operations by the brake unit 30 are made in the neighborhood of the plate workpieces, position detecting rods 73, 74 of the position detectors 71, 72 have a suitable length, and when the arms are opened, the braking operation is performed at a predetermined time after position signals from the position detectors 71, 72 have stopped changing. Conversely, when the arms are closed, the braking operation is performed at a time point when the position signals from the detectors 71, 72 have changed. Thus, when the arms are opened, the tip electrodes 8, 9 are caused to stop at a place away from the workpieces by a predetermined distance, and when the arms are closed, the electrodes 8, 9 are caused to stop at a point when the position detecting rods 73, 74 have contacted the workpieces.

Figure 9:
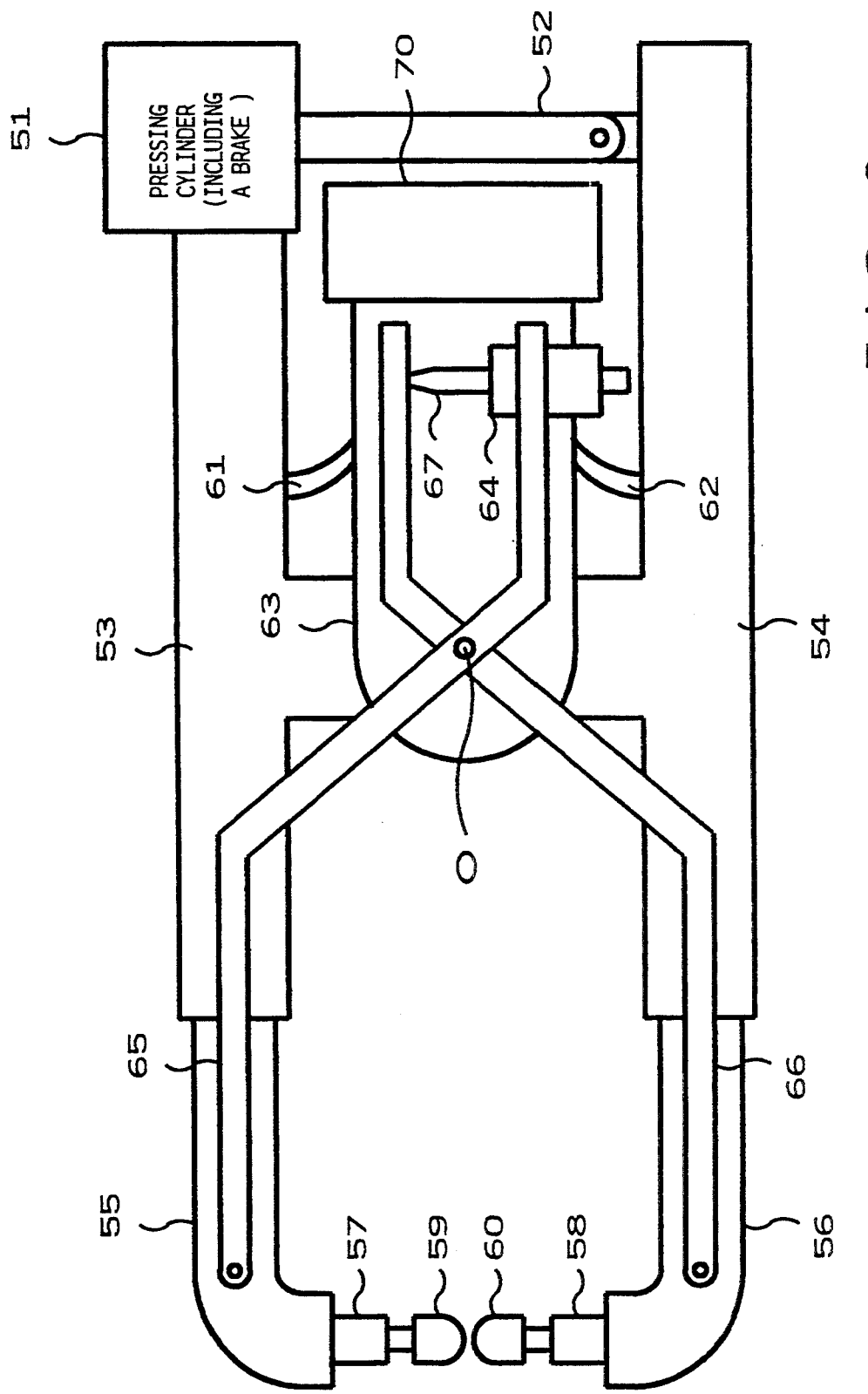
FIG. 9 is a side view, partly in section, showing schematically the entire structure of another embodiment of the spot welding machine according to the invention which is composed of the X-shaped arm type welding gun.

FIG. 9 is a view illustrating a portable type spot welding machine in which a X-shaped arm type welding gun and a welding transformer 70 are integrally combined.

The welding gun comprises a pressing cylinder 51, a cylinder rod 52, an upper arm support member 53, a lower arm support member 54, an upper arm 55, a lower arm 56, electrode holders 57 and 58, tip electrodes 59 and 60, secondary conductors 61 and 62, a transformer support member 63, a position detector 64, position detection arms 65 and 166 and a position detection rod 67.

The portions of the welding gun other than the pressing cylinder 51, the position detector 64, position detection arms 65 and 66 and position detection rod 67 are the same as those of the conventional welding gun and description of these portions will be only briefly described.

The pressing cylinder 51 is constructed with the pressing cylinder 1 and the brake unit 30 as shown in FIG. 8. That is, pressure is applied to a piston in a cylinder tube by air pressure flowing through two ports and the cylinder rod 52 is thereby moved, and the cylinder rod 52 is stopped at a desired position by the brake unit 30. Since the cylinder rod 52 and the lower arm support member 54 are rotatably connected to each other through a pin, the lower arm support member 54 is rotated about a pivot O by a linear displacement of the cylinder rod 52 and the tip electrodes 59 and 60 are thereby opened or closed.

The upper arm support member 53 holds the pressing cylinder 51 at one end and the upper arm 55 at the other end. The lower arm support member 54 has a member which is rotatably connected to the cylinder rod 52 of the pressing cylinder 51 at one end and holds the lower arm 56 at the other end. The upper arm support member 53 and the lower arm support member 54 form an X shape, the same shape as a pair of scissors, and are rotatable about the pivot O.

The upper arm 55 and the lower arm 56 are respectively of an L shape and hold the electrode holders 57 and 58 at the foremost end portions thereof. The linear arm portion formed by the upper arm support member 53 and the upper arm 55 and the linear arm portion formed by the lower arm support member 54 and the lower arm 56 are subject to pressing force applied by the pressing cylinder 51 and, therefore, these linear portions are made of a material having a sufficient rigidity to prevent flexing of the arm portions.

The electrode holders 57 and 58 hold the tip electrodes 59 and 60 which are inserted therein.

The secondary conductors 61 and 62 supply welding current from the welding transformer 70 to the electrode holders 57 and 58 and the tip electrodes 59 and 60. The welding transformer 70 is connected to an outside control device through a connector. Illustration of a device for cooling the tip electrodes 59 and 60 is omitted.

The position detector 64 is basically of the same construction as the position detector 2 of FIG. 1 and is a detector of a phase shift type for detecting the amount of displacement of the position detection rod 67. The position detector 64 is made of a coil assembly and the position detection rod 67 which is specially processed. The position detection rod 67 is constructed to return to an original position by force of a spring (not shown). That is, the position detector 64 which is of the construction shown in FIG. 2 has a spring provided therein and the rod is constantly urged toward the inner wall surface on one side.

Accordingly, the position detection rod 67 tends to spread the position detection arms 65 and 66 outwardly by the force of the spring provided in the position detection rod 67. When the angle between the position detection arms 65 and 66 has increased, the position detection rod 67 is moved by the spring provided therein. In this manner, the relative positional relation between the coil assembly of the position detector 64 and the position detection rod 67 changes and, therefore, the position detector 64 can detect the linear displacement amount thereof as the amount of displacement of the position detection arms 65 and 66.

The position detection arms 65 and 66 convert the linear displacement amount between the tip electrodes 59 and 60 to the linear displacement amount of the position detection rod 67. Therefore, the position detector 64 can detect the amount of rotation of the position detection arms 65 and 66, i.e., the displacement amount between the tip electrodes 59 and 60 by detecting the linear displacement amount of the position detection rod 67. The position detector 64 detects the distance between the tip electrodes 59 and 60 by detecting the amount of displacement of the position detection rod 67 with respect to a position at which the tip electrodes 59 and 60 are in contact with each other. Details about this position detector 64 are disclosed in Japanese Utility Model Laid-open Publication No. 57-135917, 58-136718 or 59-175105, U.S. Pat. No. 4,804,913, or European Patent No. 0212628.

Figure 10:
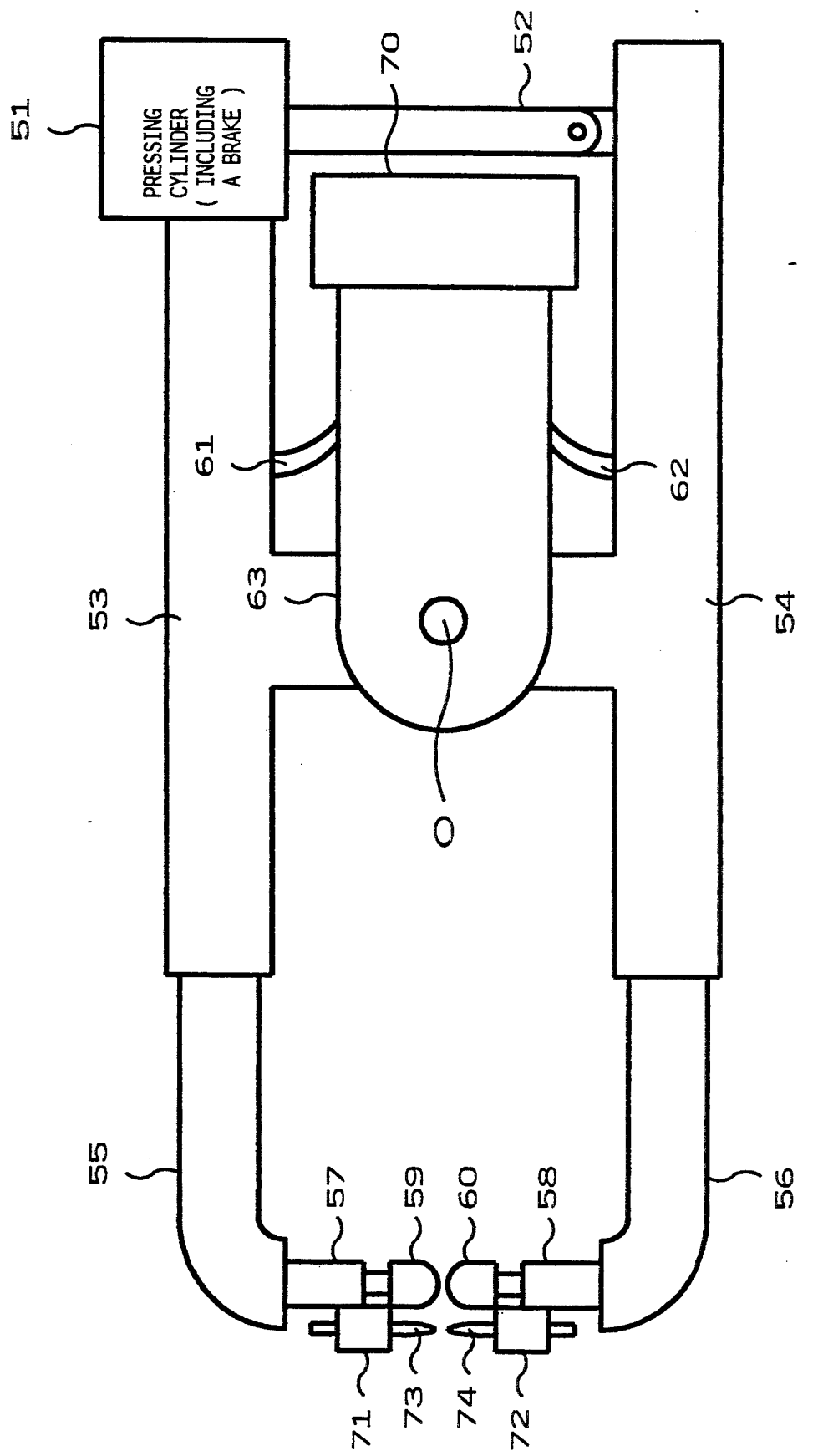
FIG. 10 is a side view, partly in section, showing a modified embodiment of the spot welding machine having the X-shaped arm type welding gun as shown in FIG. 9.

FIG. 10 shows a modified example of the spot welding machine shown in FIG. 9. In FIG. 10, the same components as those in FIG. 9 are designated by the same reference characters and description thereof will be omitted.

The embodiment of FIG. 9 can detect the distance between the electrodes accurately by the separately provided position detection arms 65 and 66 even when rigidity of the upper arm support member 53, lower arm support member 54, upper arm 55 and lower arm 56 is insufficient and they are readily deformed by the pressing force of the pressing cylinder 51. FIG. 10 shows a modification of such spot welding machine. The spot welding machine shown in FIG. 10 has, in the same manner as the embodiment of FIG. 7, two position detectors 71 and 72 provided on holders 57 and 58 on the side of the tip electrodes 59 and 60. By operating position detection values of the two position detectors 71 and 72, the distance between the tip electrodes 59 and 60 can be accurately measured.

In the above-described embodiments, a brake force is applied to the cylinder rod 11 by means of the mechanical brake unit 30 incorporated in the pressing cylinder 1. However, according to the present invention, the brake force may be applied to the cylinder rod 11 by controlling the magnitude and direction of the fluid pressure supplied into two of the air chambers of the pressing cylinder 1 by means of a fluid pressure control means such as a direction switching valve.

Such an alternative embodiment will now be described with reference to FIG. 11 which shows a spot welding machine arranged in such a manner that brake force is applied to a cylinder rod 11 by means of a fluid pressure control means such as a direction switching valve.

Figure 11:
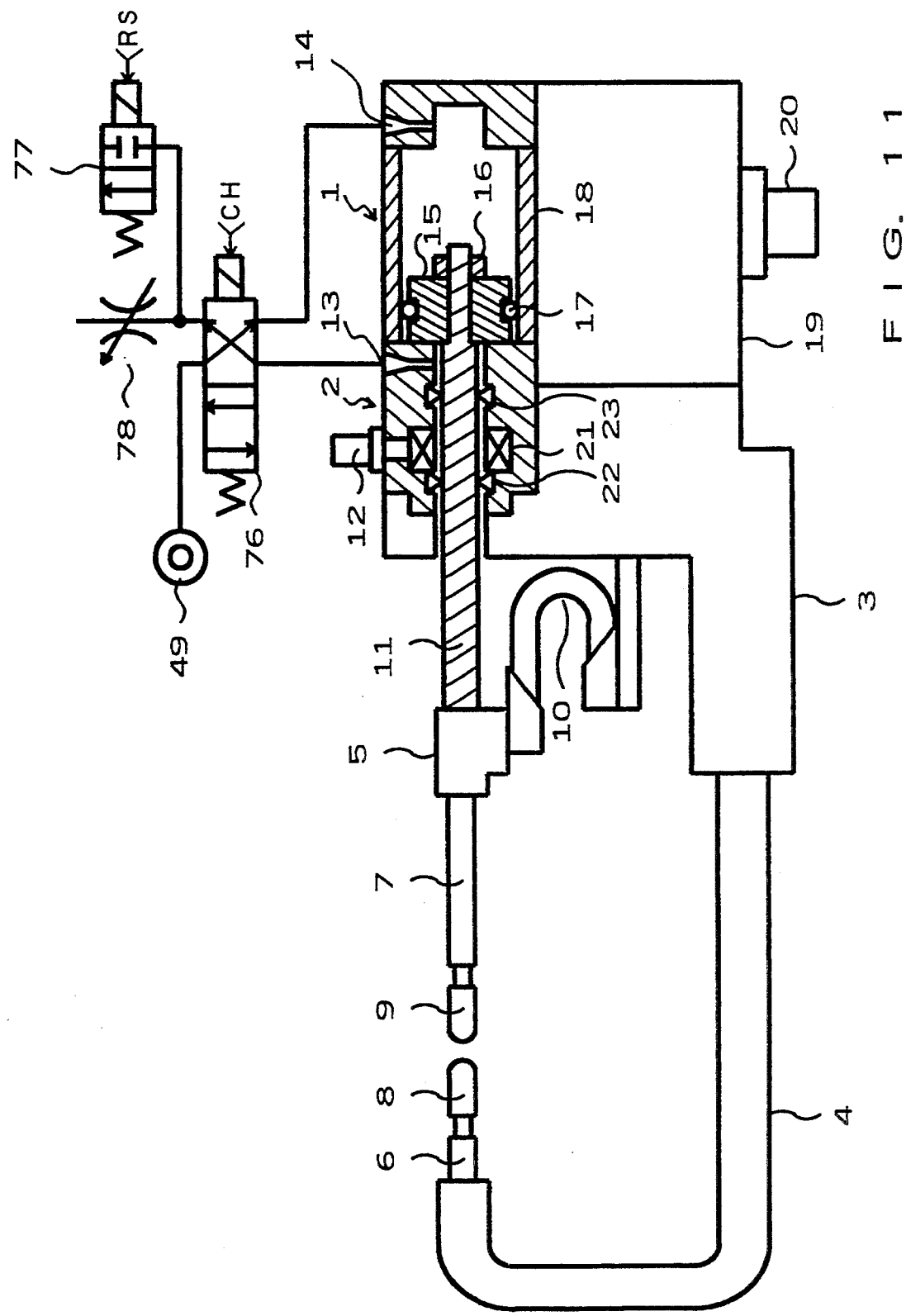
FIG. 11 is a side view, partly in cross section, of an embodiment of a spot welding machine in which a brake force is applied to the cylinder rod by a fluid pressure control section.

In FIG. 11, elements denoted by same reference characters as in FIG. 1 have same structures and functions as corresponding elements in FIG. 1 and therefore will not be described here to avoid unnecessary duplication. The spot welding machine of FIG. 11 is different from that of FIG. 1 in that the brake unit 30 is omitted, and supply and discharge of pressurized air to and from ports 13 and 14 in a pressing cylinder 1 is done by an electromagnetic valve (direction switching valve) 76, and a switching control of an amount of air discharged through the direction switching valve 76 is done by an electromagnetic valve (speed reducing valve) and a throttle valve 78.

Figure 12:
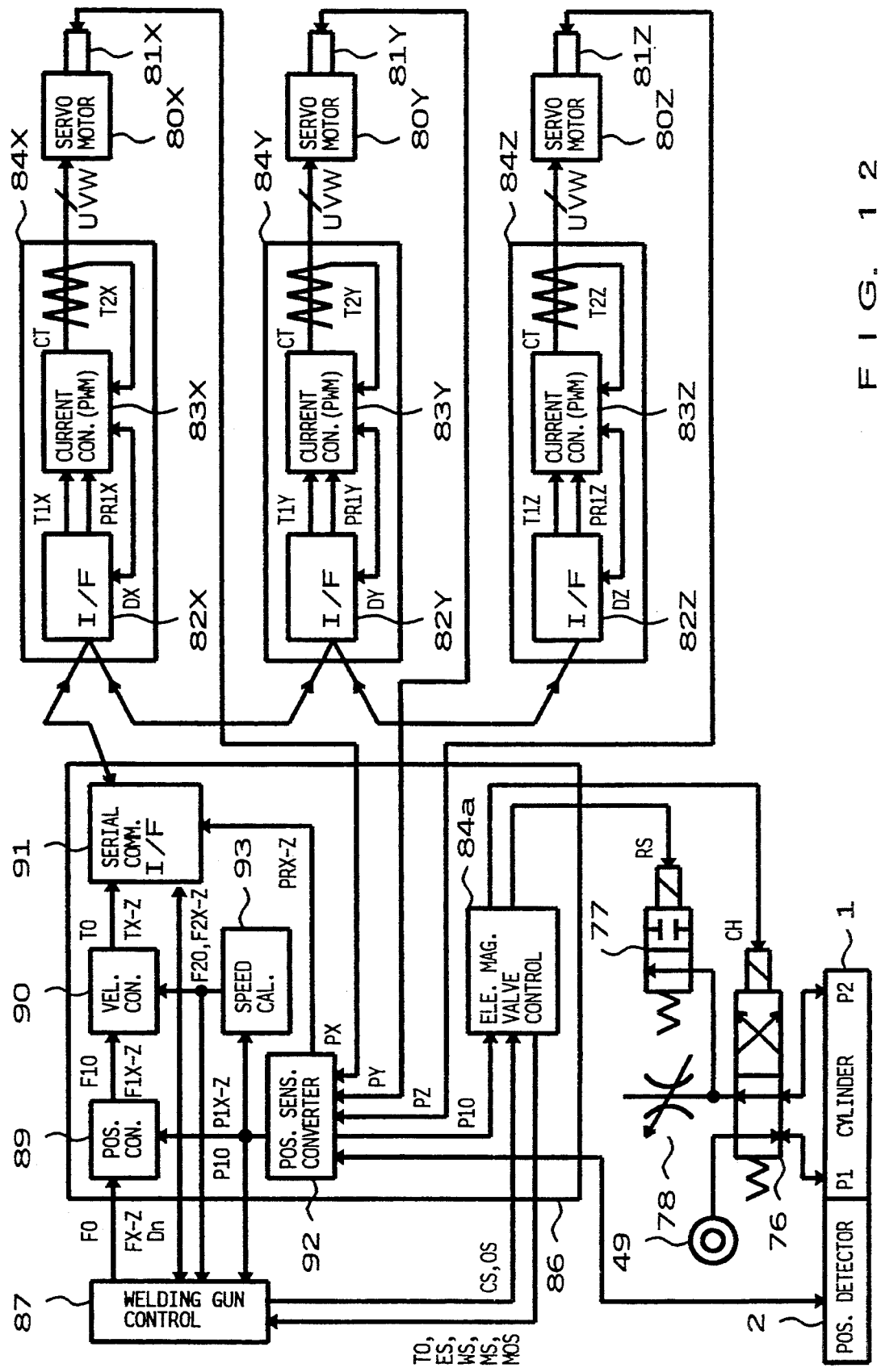
FIG. 12 is a block diagram illustrating a general structure of a positioning control system for controlling the positioning of the spot welding machine of FIG. 11 in three dimensional space.

FIG. 12 is a block diagram illustrating the general structure of the position control system for the spot welding machine shown in FIG. 11. Also in FIG. 12, elements denoted by same reference characters as in FIG. 5 have same structures and functions as corresponding elements in FIG. 5 and therefore will not be described here. The position control system of FIG. 12 is different from that of FIG. 1 in that an electromagnetic valve control section 84a inputs therein control signals (close-start signal CS and open-start signal OS) from a welding gun control section 87 and position data P0 from a position sensor converter section 92, and the section 84a outputs direction switch signal CH and speed reduction signal RS to the direction switching valve 76 and the speed reducing valve 77, respectively, to provide ON/OFF control to these valves 76, 77. On the basis of position data P10, the section 84a outputs to the welding gun control section 87 various signals indicative of various operation statuses (tip-off detection signal T0, plate thickness coincidence signal ES, plate thickness signal WS, intermediate position signal MS, wide-open position signal MOS).

An example operation of the spot welding machine of FIG. 11 controlled by the welding gun control system of FIG. 12 will now be described with reference to a timing chart shown in FIG. 13.

First, the welding gun control section 87 actuates servomotors 80X, 80Y, 80Z to thereby position the spot welding machine at a predetermined location. At time point ta when the position control has been terminated, the welding gun control section 87 provides the electromagnetic valve control section 84a with close-start signal CS (high level "1") for closing a movable arm 5 of the welding machine.

Before the close-start signal CS is received, the direction switching valve 76 is in the state as shown in FIG. 12 and the speed reducing valve 76 is in the state as shown in FIG. 11 since the welding gun control section 87 has output the speed reduction signal RS to the speed reducing valve 77 but not yet output the direction switch signal CH to the direction switching valve 76. At this time, a first chamber (air chamber on the side of the cylinder rod 11) of the pressing cylinder 1 which is defined by a cylinder tube 18 and a piston 15 introduces thereinto pressurized air from a air pressure source 49 via the direction switching valve 76 and port 13, and a second chamber (air chamber on the side of a nut 16) is in communication with the atmospheric pressure through the direction switching valve 76 and throttle valve 78, and therefore a piston 5 is located at the right end in an opposite manner to FIG. 11 and the distance between the tip electrodes 8 and 9 is at the maximum Pmax. In such a condition, the air pressure P1 in the first chamber of the pressing cylinder 1 is equivalent to the pressurized air, while the air pressure P2 in the second chamber is equivalent to the atmospheric pressure.

The electromagnetic valve control section 84a, upon receipt of the close-start signal CS at time point ta, substantially simultaneously outputs the direction switch signal CH to the direction switching valve 76 and stops outputting the speed reduction signal RS to the speed reducing valve 76. Thus, the direction switching valve 76 is switched from the state of FIG. 12 to the state of FIG. 11, while the speed reducing valve 77 is switched from the state of FIG. 11 to the state of of FIG. 12. Then, the first chamber of the pressing cylinder 1 discharges the pressurized air supplied from the air pressure source 49 to the atmospheric pressure, i.e., to the outside of the cylinder 1 via the speed reducing valve 76 and speed reducing valve 77, and the second chamber of the pressing cylinder 1 introduces thereinto the pressurized air via the direction switching valve 76 and port 14. At time point ta, the air pressure P1 in the first chamber is equivalent to the pressurized air, and the air pressure P2 in the second chamber is equivalent to the atmospheric pressure. But, with the lapse of time, the air pressure P1 in the first chamber gradually becomes smaller, and the air pressure P2 in the second chamber gradually becomes greater. In this manner, the air pressures P1 and P2 coincide with each other at time point tb, and then, at time point tc, the air pressure P1 becomes equivalent to the atmospheric pressure, and the air pressure P2 becomes equivalent to the pressurized air.

Following time point tb when the air pressures P1 and P2 have coincided with each other, the piston 15 (cylinder rod 11) moves to the leftward direction at a speed (cylinder speed CV) corresponding to a difference (P1-P2) of the two chamber pressures P1 and P2, and accordingly, the interelectrode distance P gradually becomes smaller.

When, at time point tc, the air pressure P1 becomes equivalent to the atmospheric pressure and the air pressure P2 becomes equivalent to the pressurized air, the piston 15 and cylinder rod 11 move to the leftward direction at a given cylinder speed CV corresponding to the difference (P1-P2) of the two pressures P1 and P2.

When the interelectrode distance P, which gradually becomes smaller after time point tb on, falls below a predetermined wide-open detection position PA at time point td, the electromagnetic valve control section 84a stops outputting a wide-open position signal MOS to the welding gun control section 87. When output of the wide-open position signal MOS is present (ON), the welding gun control section 87 recognizes that the interelectrode distance P is above the predetermined wide-open detection position PA and the spot welding machine is in the wide-open state. When, on the other hand, output of the wide-open position signal MOS is absent (OFF), the welding gun control section 87 recognizes that the spot welding machine is in the closed state. Thus, on the basis of the wide-open position signal MOS, the welding gun control section 87 actuates the servomotors 80X, 80Y, 80Z and controls other sequential operations.

After time point td, the interelectrode distance P becomes further smaller. When the interelectrode distance P falls below a predetermined intermediate detection position PB at time point te, the electromagnetic valve control section 84a stops outputting an intermediate position signal MS to the welding gun control section 8 7 and outputs the speed reduction signal RS to the speed reducing valve 77. When output of the intermediate position signal MS is present (ON), the welding gun control section 87 recognizes that the interelectrode distance P is above the predetermined intermediate detection position PB. When, on the other hand, output of the intermediate position signal MS is absent (OFF), the welding gun control section 87 recognizes that the spot welding machine is in the closed state. Value of the intermediate position signal MS can be set as desired, so that by, for example, setting a range in which the workpieces are not influenced by the tip electrodes of the spot welding machine, it is made possible to position the welding machine when the intermediate position has been exceeded. In this way, the welding gun control section 87 can actuate the servomotors 80X, 80Y, 80Z for position control before the interelectrode distance PA reaches the wide-open detection position PA, thereby considerably reducing the overall operation time.

Further, because the speed reducing valve having received the speed reduction signal RS is switched from the state of FIG. 12 to the state of FIG. 11 and thus the first chamber of the pressing cylinder 1 discharge the pressurized air to the atmosphere through the port 13, direction switching valve 76 and throttle valve 78, the first chamber pressure P1 in the pressing cylinder 1 becomes gradually greater to reach pressure P1g at time point tg. Thus, after time point te, the cylinder speed CV is reduced as the first chamber pressure P1 rises, and after time point tg, the piston 15 (cylinder rod 11) is caused to move leftwardly at a constant cylinder speed CV corresponding to the pressure difference (P1g–P2), in response to which the interelectrode distance P becomes gradually smaller.

When, after time point te, the interelectrode distance P is reduced to fall below a predetermined plate thickness upper limit position PC at time point tf, the electromagnetic valve control section 84a outputs a plate thickness coincidence signal ES to the welding gun control section 87. The welding gun control section 87, when the plate thickness upper limit position PC is output (ON), judges that the interelectrode distance P is below the plate thickness upper limit position PC and plate workpieces are securely held between the tip electrodes 8 and 9.

When the interelectrode distance P is further reduced so that the tip electrodes 8 and 9 is brought into contact with the plate workpieces at time point th, the cylinder speed CV comes to "0", in response to which the electromagnetic valve control section 84a outputs a plate thickness signal WS. After time point th, the cylinder speed CV remains at "0", so that the first chamber pressure P1 in the cylinder 1 is gradually reduced to become equivalent to the atmospheric pressure.

After time point th, i.e., after the plate thickness signal WS has been received, the welding gun control section 87 performs spot welding while measuring a change, in the order of tens of micrometers, in the interelectrode distance on the basis of the plate thickness PD.

At time point ti when the spot welding has been completed, the welding gun control section 87 outputs to the electromagnetic valve control section 84a an open-start signal OS (low level "0") for opening a movable arm 5 of the welding machine.

Upon receipt of the open-start signal OS from the welding gun control section 87 at time point ti, the electromagnetic valve control section 84a substantially simultaneously stops outputting the speed reduction signal RS and direction switch signal CH so that the direction switching valve 76 and speed reducing valve 77 are switched from the state of FIG. 11 over to the state of FIG. 12. Thus, the first chamber of the pressing cylinder 1 introduces there into the pressurized air supplied from the air pressure source 49 via the speed reducing valve 76 and port 13, and the second chamber of the pressing cylinder 1 discharges the pressurized air to the atmosphere via the port 14, direction switching valve 76 and speed reducing valve 77. At time point ti, the air pressure P1 in the first chamber is equivalent to the atmospheric pressure, and the air pressure P2 in the second chamber is equivalent to the pressurized air. But, with the lapse of time, the air pressure P1 in the first chamber becomes gradually greater, and the air pressure P2 in the second chamber becomes gradually smaller. In th is manner, the air pressures P1 and P2 coincide with each other at time point tj, and then, at time point tm, the air pressure P1 becomes equivalent to the pressurized air pressure, and the air pressure P2 becomes equivalent to the atmospheric pressure.

Following time tj when the air pressures P1 and P2 coincide with each other, the piston 15 (cylinder rod 11) moves to the rightward direction at a speed (cylinder speed CV) corresponding to a difference (P1–P2) of the two chamber pressures P1 and P2, and accordingly, the interelectrode distance becomes gradually greater.

When, at time point tm, the air pressure P1 becomes equivalent to the pressurized air pressure and the air pressure P2 becomes equivalent to the atmospheric pressure, the piston 15 and cylinder rod 11 move to the rightward direction at a constant cylinder speed CV.

When, after time point tj, the interelectrode distance P is reduced to fall above the predetermined plate thickness upper limit position PC at time tk, the electromagnetic valve control section 84a stops outputting the plate thickness coincidence signal ES to the welding gun control section 87. The welding gun control section 87, when output the plate thickness upper limit position PC is stopped (OFF), judges that the interelectrode distance P is above the plate thickness upper limit position PC and plate workpieces are released from between the tip electrodes 8 and 9.

Then, when the interelectrode distance P is increased to fall above the intermediate detection position PB at time tn, the electromagnetic valve control section 84a outputs the intermediate position signal MS to the welding gun control section 87. In this embodiment, the electromagnetic valve control section 84a outputs the speed reduction signal RS to the speed reducing valve 77 at time point tp, i.e., a predetermined time after at this time point tn, although the speed reduction signal RS may be output to the valve 77 at time point tn. The welding gun control section 87, when the intermediate position signal MS is received from the electromagnetic valve control section 84a, realizes that the interelectrode distance P has exceeded the intermediate detection position PB.

Further, because the speed reducing valve 77 having received the speed reduction signal RS at time tp is switched from the state of FIG. 12 to the state of FIG. 11 and thus the second chamber of the pressing cylinder 1 discharge the pressurized air to the atmosphere through the port 14, direction switching valve 76 and throttle valve 78, the second chamber pressure P2 in the pressing cylinder 1 becomes gradually greater with the lapse of time to reach pressure P2r at time point tr. Thus, after time point tp, the cylinder speed CV is reduced as the second chamber pressure P2 increases, and the piston 15 (cylinder rod 11) is caused to move rightwardly at a constant cylinder speed CV corresponding to the pressure difference (P1–P2p), in response to which the interelectrode distance P becomes gradually greater.

When the interelectrode distance P gradually becomes greater to exceed the wide-open detection position PA at time point tq, the electromagnetic valve control section 84a outputs the wide-open position signal MOS to the welding gun control section 87. When the wide-open position signal MOS is received in this manner, the welding gun control section 87 recognizes that the interelectrode distance P is above the wide-open detection position PA and the spot welding machine is in the open state.

When the movable arm 5 of the spot welding machine stops is caused to stop moving and the interelectrode distance reaches the maximum value Pmax at time point ts, the cylinder speed CV becomes "0", and thereafter the second chamber pressure P2 in the pressing cylinder 1 is gradually reduced to be equivalent to the atmospheric pressure at time tt.

In this way, the welding gun control section 87 in the control system of FIG. 12 performs one cycle of the welding operation which ranges from time ta to time tt.

During the above-described welding operation, when the tip electrodes 8, 9 have failed to hold the plate workpieces therebetween, or when the electrodes 8, 9 have worn more than a predetermined wear amount, or when the electrodes 8, 9 have accidentally come off holders 6, 7, the interelectrode distance P is, after time point th, caused to move in a manner as shown in broken line Per without being stopped by the plate thickness PD.

When the interelectrode distance P falls below a predetermined plate thickness lower limit position PE past the plate thickness PD at time point tv as shown in broken line Per, the electromagnetic valve control section 84a stops outputting the plate thickness coincidence signal ES to the welding gun control section 87. If output of the plate thickness coincidence signal ES is stopped before output of the plate thickness signal WS is stopped, then the welding gun control section 87 outputs an alarm signal indicative of an abnormal plate thickness, judging that the plate workpieces are not held between the tip electrodes.

Further, if the interelectrode distance P is reduced to fall below a predetermined tip-off detection position PF at time point tv, then the electromagnetic valve control section 84a outputs a tip-off detection signal TO to the welding gun control section 87, upon receipt of which signal TO the control section 87 outputs an alarm indicating that at least one of the tip electrodes 8, 9 has come off the corresponding holders 6, 7.

It is to be understood that a tip wear amount detection position may be provided between the plate thickness lower limit position PE and the tip-off detection position PF so as to detect a wear amount of the tip electrodes 8, 9.

The above-mentioned embodiment has been described as being arranged such that, by performing ON/OFF control of the speed reducing valve 77, the throttle valve 78 is actuated and a brake force is applied to the movement of the cylinder rod 11 to reduce the moving speed of the rod 11. However, with the brake force given by the throttle valve 78 alone, it may take a long time before the cylinder speed CV is reduced to a predetermined speed. So, in order to provide a solution to the problem, an improved method for controlling the electromagnetic valve will be described below which allows the cylinder speed CV to be reduced in a short time by improving the ON/OFF controls of the direction switching valve 76, speed reducing valve 77 and throttle valve 78.

Figure 14:
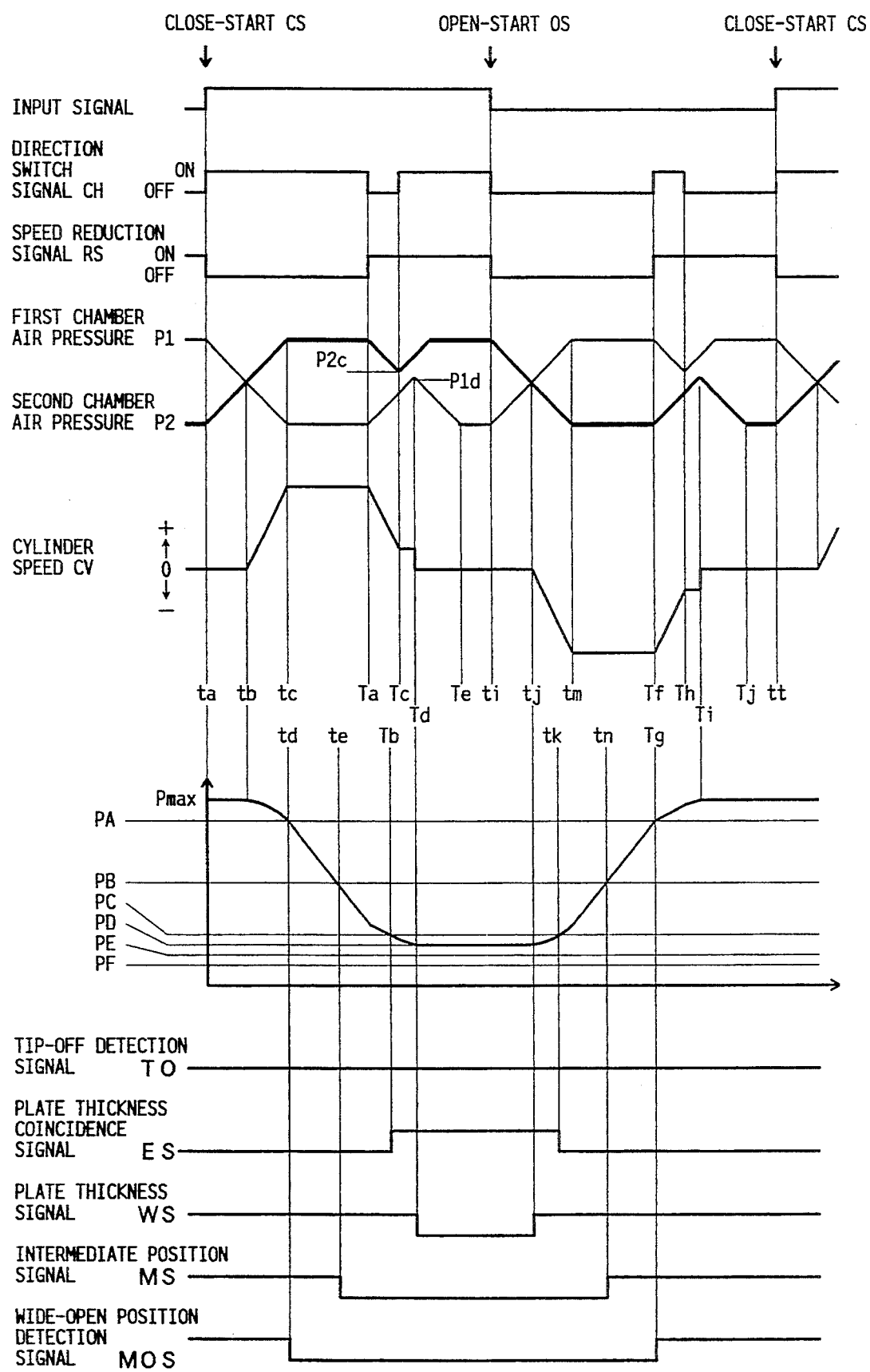
FIG. 14 is a timing chart explanatory of another example operation of the spot welding machine of FIG. 11 which is controlled by the welding gun control system of FIG. 12.

FIG. 14 is a timing chart explanatory of the operation of the welding gun control section of FIG. 12 operated in accordance with the improved control method.

Figure 13:
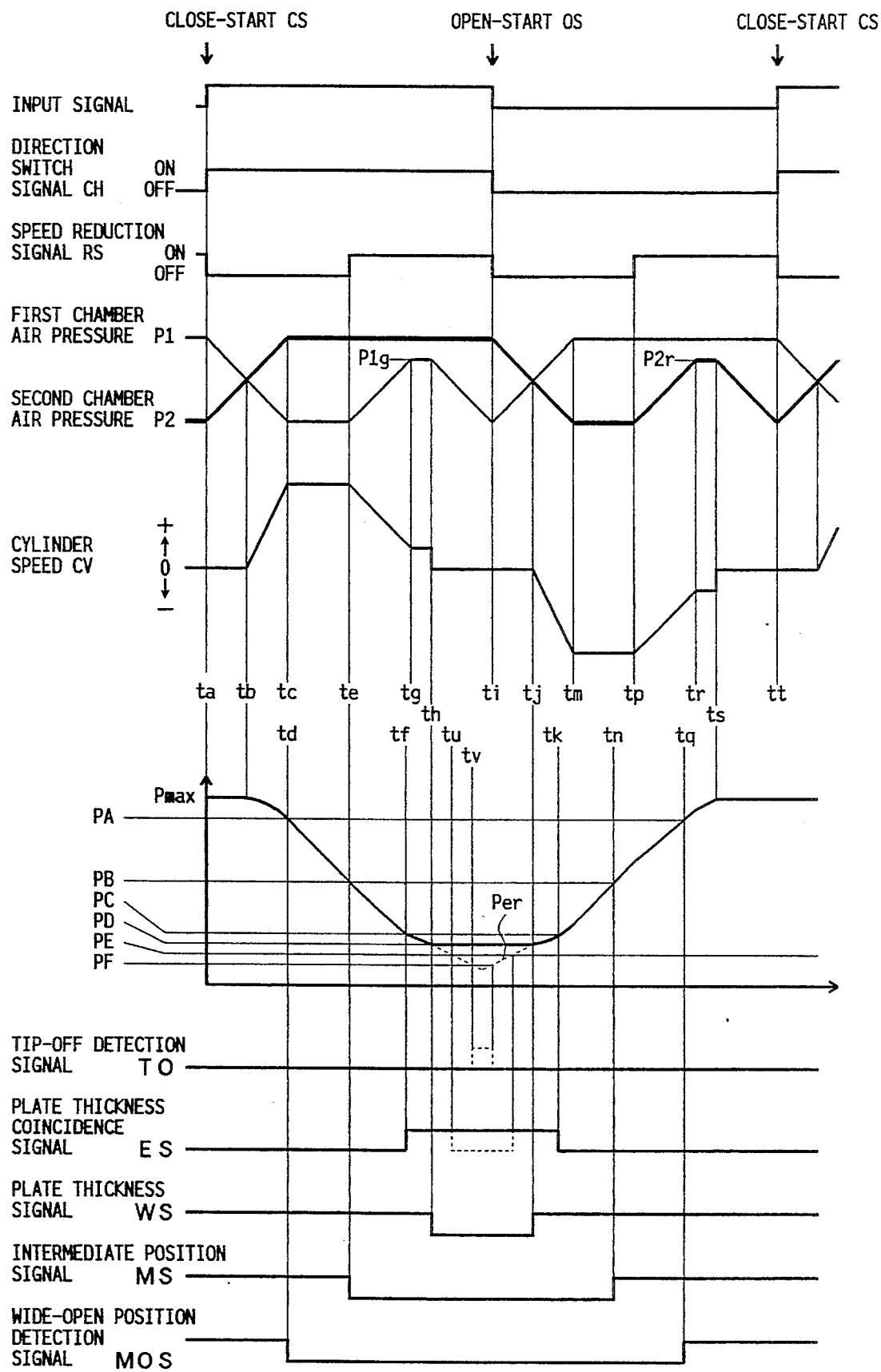
FIG. 13 is a timing chart explanatory of an example operation of the spot welding machine of FIG. 11 which is controlled by the welding gun control system of FIG. 12.

In FIG. 14, components denoted by the same reference characters as in FIG. 13 represent same components as in FIG. 13 and will not be described. The control method of FIG. 14 is different from that of FIG. 13 in that the electromagnetic valve control section 84a stops outputting the direction switch signal CH to the direction switching valve 76 at the same time that it starts outputting the speed reduction signal RS to the speed reducing valve 77, and the control section 84a again outputs the direction switch signal after a predetermined time.

More specifically, when the interelectrode distance P is gradually reduced to fall below the intermediate detection position PB at time point te, the electromagnetic valve control section 84a stops outputting the intermediate position signal MS to the welding gun control section 87. Then, at time point Ta that is a predetermined time after this time point te, the electromagnetic valve control section 84a stops outputting the direction switch signal CH to the direction switching valve 76 at the same time that it starts outputting the speed reduction signal RS to the speed reducing valve 77.

In response to this, the direction switching valve 76 is switched from the state of FIG. 11 to the state of FIG. 12 while the speed reducing valve 77 is switched from the state of FIG. 12 to the state of FIG. 11. Thus, the first chamber in the pressing cylinder 1 is caused to introduce there into the pressurized air from the air pressure source 49 through the direction switching valve 76 and port 13, while the second chamber is caused to discharge the pressurized air to the atmosphere through the port 14, direction switching valve 76 and throttle valve 77. Accordingly, the first chamber air pressure P1 is gradually increased to reach pressure value P1d at time point Td, and the second air chamber pressure P2 is gradually reduced to reach pressure value P2c at time point Tc.

At time point Tc, the electromagnetic valve control section 84a again outputs the direction switch signal CH to the direction switching valve 76. Upon receipt at time point Tc of the direction switch signal CH, the direction switching valve is switched from the state of FIG. 12 to the state of FIG. 11. Then, the first chamber in the pressing cylinder 1 is caused to discharge the pressurized air to the atmosphere; however, since the pressurized air is discharged through the throttle valve 76, the first chamber air pressure P1 rises toward pressure value P1g of FIG. 12. In addition, because the tip electrodes 8, 9 come into contact with the plate workpieces at time point Td, the first chamber air pressure P1 stops rising at time point Td and thereafter reduces toward the level of the atmospheric pressure. On the other hand, because the second chamber is caused to introduce thereinto the pressurized air from the air pressure source 49 through the direction switching valve 76 and port 14, the second chamber air pressure P2 increases with the lapse of time to become equivalent to the level of the pressurized air.

Then, after time point Tc, the piston 15 (cylinder rod 11) is moved leftwardly at a constant speed (cylinder speed CV) corresponding to the difference of the first and second chamber air pressure (P1-P2), in accordance with which movement the interelectrode distance P is gradually reduced and the cylinder speed CV reaches "0" at time point Td. Since the cylinder speed CV remains at "0" after time point Td, the first chamber air pressure P1 gradually reduces and becomes equivalent to the atmospheric pressure.

After time point Td, the welding gun control section 87 performs spot welding in a manner as shown in FIG. 13, and when the required spot welding is completed, it causes the movable arm to open as mentioned previously.

As mentioned above, the improved method performs ON/OFF control of the speed reducing valve 77 to apply braking force to the cylinder rod 11 and also simultaneously performs ON/OFF control of the direction switching valve 76 to even more rapidly reduce the moving speed of the cylinder rod 11, so that it is made possible to drastically reduce the time necessary for the cylinder rod 11 to stop its movement.

It should be understood that, although the embodiments of FIGS. 13 and 14 perform ON/OFF control of the same electromagnetic valve for both opening and closing the movable arm 5, the ON/OFF control of the electromagnetic valve may be performed only for closing the arm 5.

Although the spot welding machine in accordance with the embodiment of FIG. 11 can apply braking force to the cylinder rod 11 to reduce its moving speed by controlling the magnitude and direction of fluid pressure supplied into the two chambers of the pressing cylinder 1 by the use of a specific fluid pressure control means such as a direction switching valve, it can never stop the cylinder rod 11 at a predetermined intermediate position as achieved by the brake unit 30.

Figure 15:
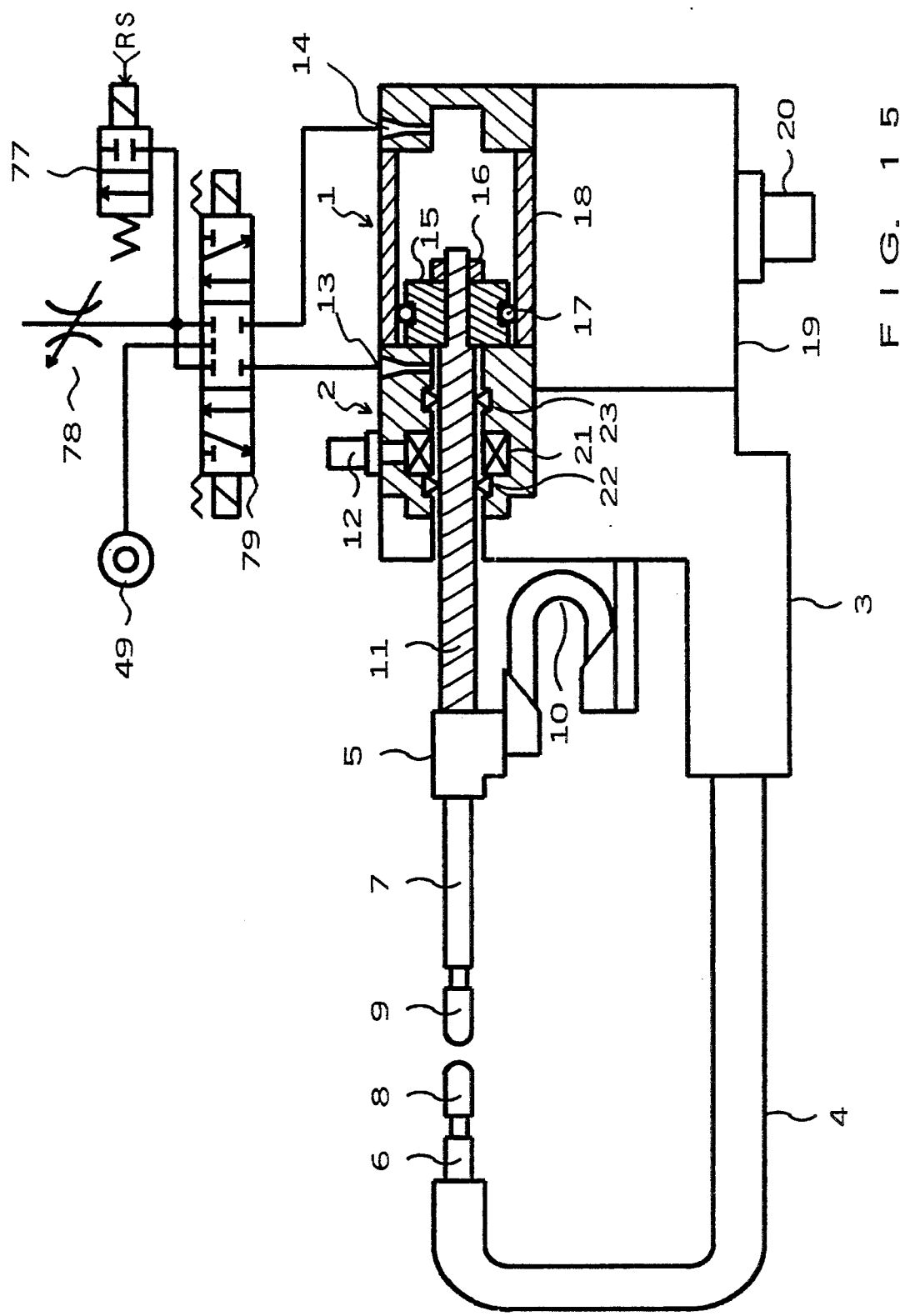
FIG. 15 is a side view, partly in cross section, of another embodiment of a spot welding machine in which a brake force is applied to the cylinder rod by a fluid pressure control device.

Therefore, as shown in FIG. 15, a three-position valve of a closed-center type may be provided in stead of the direction switching valve 76, in order to allow the cylinder rod 11 to be stopped at a predetermined intermediate position.

In FIG. 15 again, components denoted by the same reference characters as in FIG. 11 have the same structures and functions as those of FIG. 11 and therefore will not be described here. The spot welding machine of FIG. 15 is different from that of FIG. 11 in that the three-position valve of a closed-center type is employed as a substitute for the direction switching valve.

This three-position valve 79, when it is at the right or left side position, only serves to switch the direction of fluid pressure just like the above-mentioned direction switching valve 77. However, when in the center position, the valve 79 serves to stop supply and discharge of the pressurized air with respect to the pressing cylinder so as to pneumatically of the cylinder rod 11.

Figure 6:
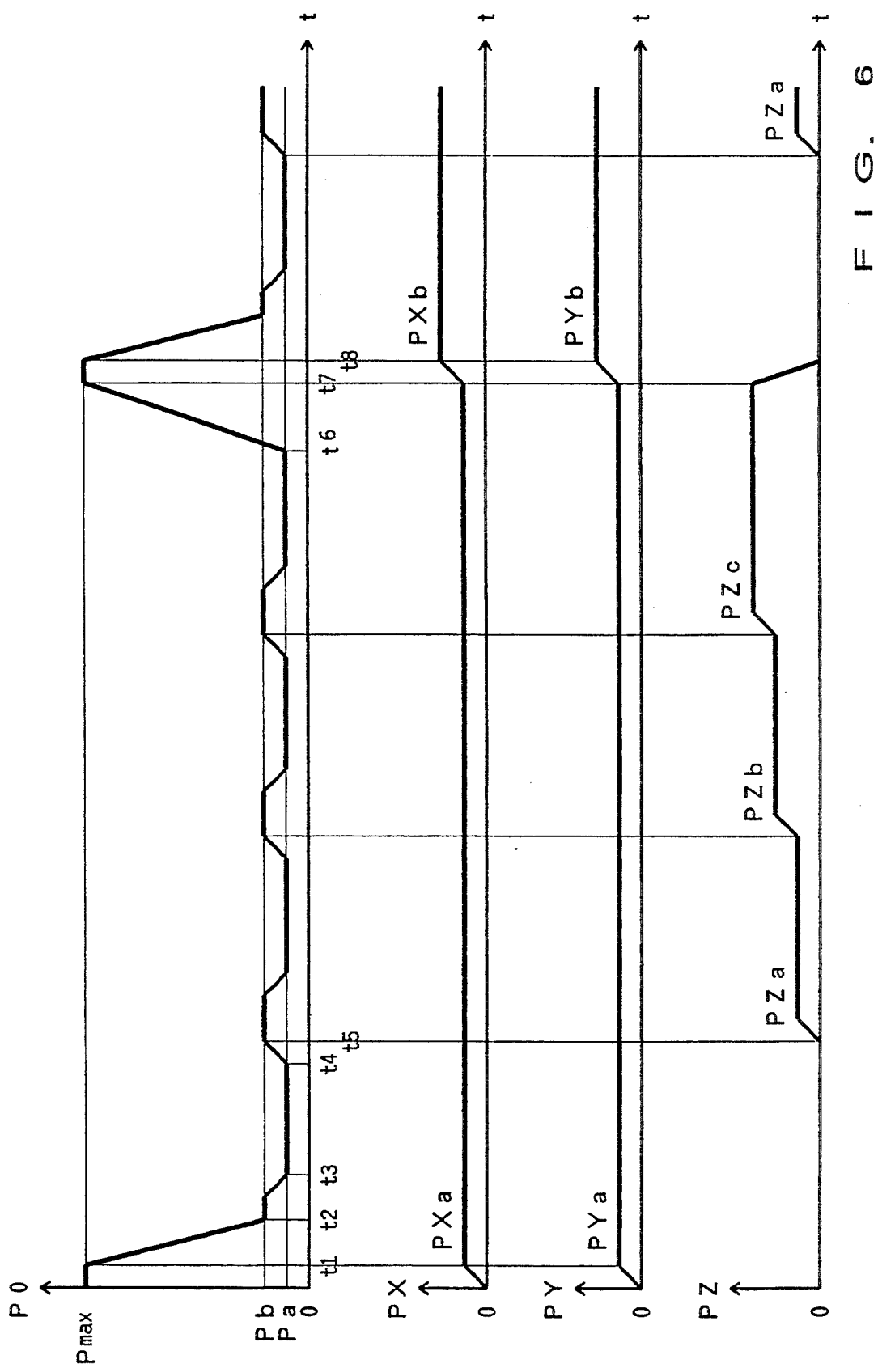
FIG. 6 is a diagram showing a relation between the positioning control of the spot welding machine and the control of the inter-electrode distance.

Thus, by suitably making ON/OFF control of this three-position valve 79 by the use of the electromagnetic valve control section 12 of FIG. 12, it is made possible to stop the pressing cylinder 1 at any suitable position Pb as shown in FIG. 6 and also to perform speed reducing control of the cylinder 1 as shown in FIGS. 13 and 14.

It should be understood that the three-position valve may alternatively be of a center-supply type rather that the closed-center type. In such a case, a pressure reducing valve must be provided in one of the ports.

Further, although the position detector 2 and the pressing cylinder 1 are integrally constructed with each other in the spot welding machines of FIGS. 11 and 15, position detectors 71, 72 may be provided near the tip electrodes 8, 9 in such a manner as shown in FIGS. 8 and 10, and a position detector 64 may be provided by means of position detecting arms 71, 72 as shown in FIG. 9. Moreover, the brake unit 30 may be included in the spot welding machine of FIG. 11 in order to permit the intermediate position stop control, or the brake unit 30 may be included in the spot welding machine of FIG. 15 in order to increase the braking force.

Furthermore, although output of the direction switch signal CH is stopped for predetermined time (between time points Ta and Tc) in the embodiment of FIG. 14, ON/OFF control of the direction switch signal CH may be repeatedly performed by plural pulses of small pulse width.

Furthermore, although, in the embodiment of FIG. 13, the moving speed is reduced by outputting the speed reduction signal RS to discharge the pressurized air to the atmosphere through the throttle valve 78, the moving speed may be reduced by performing ON/OFF control of the direction switching valve 76 with the direction switch signal CH, without using the throttle valve 78. In such a case, the direction switch signal CH may be ON/OFF controlled by plural pulses of small pulse width.

In the welding gun control system of FIG. 5, the brake valve 47 itself operates on the real time basis in accordance with ON/OFF control signals of the brake control section 94, but the pressurized air of the brake unit 30, because of its pressurization, acts much later than the switching operation of the brake valve 47. In view of this, in this embodiment, values obtained when accurate position control can not be achieved due to the delayed action of the pressurized air are stored as correction values, so that, in a next position control, the target position instruction signal F0 or the current position data P10 is corrected on the basis of the stored correction values. In this way, the above-mentioned delayed action of the pressurized air can be properly adjusted and thus it is made possible to achieve highly accurate positioning. Such a positioning method is known as a learning position control and may of course be applied to the case where the three-position valve of the closed center type is employed for positioning control.

The above description has been made about the embodiments in which the portable type welding gun is used as the spot welding machine. The invention however is applicable to any type of spot welding machine if it is of a type in which pressing force is generated by a pressing cylinder.

Pressing force of the pressing cylinder may be varied as required, through the above-mentioned ON/OFF control of the servo valve or direction switching valve.

Further, the fluid pressure controlling piping as shown in the above-mentioned embodiments is only exemplary and may of course be constructed in various other manners in correspondence with the purposes of the present invention.

In the embodiment of FIG. 9, the pivot point of the position detection arms 65 and 66 is coincidental with the pivot point of the welding gun. However, these pivot points need not necessarily be coincidental. The position detector 64 may be provided between the fixing point of the position detection arms 65 and 66 and the upper arm 55 and the lower arm 56 and the pivot O.

The position detector 64 in FIG. 9 is a linear position detector. Alternatively, a rotational position at the pivot O of the upper arm support member 53 and the lower arm support member 54 or the position detection arms 65 and 66 may be detected directly by using a rotational position detectors of a phase shift type. As this type of rotational position detector, one disclosed in Japanese Patent Laid-open Publication No. 57-70406 or U.S. Pat. No. 4,754,220, for example, may be employed.

In the spot welding machine shown in FIG. 9, the position detector 2 and the cylinder rod as shown in FIG. 1 may be provided on the pressing cylinder 51 to detect the displacement amount of the cylinder rod 52.

The spot welding machine shown in FIG. 1 may be provided with the position detection arm as shown in FIG. 9.

In the above described embodiments, the coil section consists of four phases of A to D. The invention however is not limited to this but the coil section may consist of two phases, three phases or any number of phases greater than one.

In the embodiment of FIG. 3, the phase difference amount $\phi$ is detected digitally but this amount may be detected in an analog manner.

In the above described embodiments, the magnetic graduation section is formed directly on the rod. Alternatively, the magnetic graduation section may be provided separately from the rod at a position where the magnetic graduation section is moved in an interlocked motion with the rod.

In the embodiments of FIGS. 7, 8 and 10, the position detectors are mounted on the tip electrodes and the holders. Alternatively, the position detectors may be mounted on the arms.

The present invention as arranged in the above-mentioned manner achieves the advantageous result that the tip electrodes can be positioned at any desired intermediate position between the maximum and minimum value positions, by properly actuating the brake unit in accordance with a distance between the tip electrodes which is detected by interelectrode distance detection means.

Moreover, according to the present invention, the moving speed of the pressing cylinder can be variably controlled in accordance with the output of detection means, i.e., the detected interelectrode distance, and therefore the moving speed can be reduced as the tip electrodes approach the plate workpieces. As the result, it is possible to effectively lessen the impact caused when the tip electrodes are brought into contact with the plate workpieces, and thereby damage to the plate workpieces and wear of the tip electrodes can be effectively prevented.

Furthermore, because signal indicative of the open state of the tip electrodes is output on the basis of the output of the detection means when it is judged that the interelectrode distance is greater than a predetermined value, it is allowed readily automatically detect unusual conditions such welding to the workpieces of the tip electrode, and therefore it is made possible to promptly deal with malfunctions of the machine.

What is claimed is:

1. A spot welding machine comprising:
   first and second tip electrodes for holding therebetween plates to be joined with a pressing force of a predetermined magnitude and causing current to flow through the plates;
   first and second arms for supporting the first and second tip electrodes and transmitting the pressing force of the predetermined magnitude to the first and second tip electrodes;
   a pressing actuator for moving at least one of the first and second arms to apply the pressing force to said plates via said tip electrodes;
   distance-between-electrodes detection means for detecting a distance between the first and second tip electrodes; and
   brake means for braking a movement of said pressing actuator, wherein said brake means is a full pneumatic type brake which comprises a brake bush provided around a rod of said actuator, a cone-shaped spring for pressing said brake bush against said rod and a brake piston movable along the rod in response to a change in air pressure applied thereto in order to deform said cone-shaped spring against resilient force thereof, and wherein a brake force is applied to said rod by a frictional force produced between said brake bush and said rod.

2. A spot welding machine as defined in claim 1, in which said brake means brakes the movement of said actuator by means of fluid pressure control means for controlling a magnitude and direction of fluid pressure in two fluids chamber formed in said actuator.

3. A spot welding machine as defined in claim 2, in which said fluid pressure control means brakes said actuator by performing ON/OFF controls of a direction switching valve to switch a direction in which fluid is supplied to and discharged from the two fluid chambers.

4. A spot welding machine as defined in claim 1, in which said pressing actuator comprises a fluid-powered cylinder and said distance-between-electrodes detection means detects said distance between the first and second tip electrodes by detecting a stroke position of said cylinder.

5. A spot welding machine as defined in claim 4, in which said distance-between-electrodes detection means comprises:
   a coil section having at least a primary coil which is excited by a predetermined ac signal;
   a magnetism-responsive section provided in a predetermined pattern along the axial direction of a rod of said cylinder so as to change reluctance in a magnetic path in the coil section in accordance with displacement of the rod; and
   a position detection circuit for obtaining data representing the position of the rod on the basis of a change in reluctance in the magnetic path in the coil section produced by a relative positional relation between the magnetism-responsive section and the coil section.

6. A spot welding machine as defined in claim 5, in which said coil section includes plural primary coils and plural secondary coils; and
   said position detection circuit including,
   a circuit for exciting the primary coils by reference ac signals which are out of phase from one another,
   an output circuit for summing outputs of the secondary coils and generating an output signal by phase-shifting the reference ac signals in accordance with a relative linear position of the rod, and
   a circuit for detecting a phase difference between a predetermined reference ac signal and the output signal from the output circuit and providing the detected phase difference data as the rod position data.

7. A spot welding machine as defined in claim 1, in which said distance-between-electrodes detection means detects said distance between the first and second tip electrodes by detecting displacement of the first and second arms.

8. A spot welding machine as defined in claim 7, in which said distance-between-electrodes detection means comprises:
   first and second position detection arms connected rotatably at one end thereof to the first and second arms in such a manner that the first and second position detection arms are rotated about their pivot points in accordance with movement of the first and second arms;
   distance-between-arms detection means, provided between the first and second position detection arms, for detecting the displacement of the first and second arms relative to the plates by detecting displacement of the first and second position detection arms which are rotated in accordance with movement of the first and second arms.

9. A spot welding machine as defined in claim 8, in which said distance-between-arms detection means includes:
   a rod having one end in contact with the first position detection arm;
   a coil section provided on the second position detection arm, having at least a primary coil which is excited by a predetermined ac signal and being coupled magnetically to the rod;
   a magnetism-responsive section provided in a predetermined pattern along the axial direction of said rod so as to change reluctance in a magnetic path in the coil section in accordance with movement of the rod; and
   a position detection circuit for obtaining data representing the position of the rod on the basis of change in reluctance in the magnetic path in the coil section produced by a relative positional relation between the magnetism-responsive section and the coil section.

10. A spot welding machine as defined in claim 9, in which said coil section includes plural primary coils and plural secondary coils; and
   said position detection circuit including,
   a circuit for exciting the primary coils by reference ac signals which are out of phase from one another,
   an output circuit for summing outputs of the secondary coils and generating an output signal by phase-shifting the reference ac signals in accordance with a relative linear position of the rod, and
   a circuit for detecting a phase difference between a predetermined reference ac signal and the output signal from the output circuit and providing the detected phase difference data as the rod position data.

11. A spot welding machine as defined in claim 7, in which said distance-between-electrodes detection means comprises first and second detecting means mounted on the first and second arms respectively, for detecting respective displacement of the first and second arms relative to the plates.

12. A spot welding machine as defined in claim 11, in which said first or second detecting means includes:
   a rod provided so that one end thereof contacts the plates;
   a coil section provided on the first or second arm, having at least a primary coil excited by a predetermined ac signal and being coupled magnetically to the rod;
   a magnetism-responsive section provided in a predetermined pattern along the axial direction of said rod so as to change reluctance in a magnetic path in the coil section in accordance with movement of the rod; and
   a position detection circuit for obtaining data representing the position of the rod on the basis of change in reluctance in the magnetic path in the coil section produced by a relative positional relation between the magnetism-responsive section and the coil section.

13. A spot welding machine as defined in claim 7, in which said pressing actuator comprises a fluid-powered cylinder and said spot welding machine further comprises second distance-between-electrodes detection means for detecting distance between the first and second tip electrodes by detecting a stroke position of said cylinder.

14. A spot welding machine as defined in claim 13, in which said second distance-between-electrodes detection means includes:
   a coil section having at least a primary coil which is excited by a predetermined ac signal;
   a magnetism-responsive section provided in a predetermined pattern along the axial direction of the rod of the cylinder so as to change reluctance in a magnetic path in the coil section in accordance with displacement of the rod; and
   a position detection circuit for obtaining data representing the position of the rod on the basis of change in reluctance in the magnetic path in the coil section produced by a relative positional relation between the magnetism-responsive section and the coil section.

15. A spot welding machine as defined in claim 1 comprising a C-shaped welding gun.

16. A spot welding machine as defined in claim 1 comprising an X-shaped welding gun.

17. A spot welding machine as defined in claim 1, which further comprises control means for performing a control to position said tip electrodes at a desired position by actuating said brake means in accordance with the distance between said electrodes which is detected by said distance-between-electrodes detection means.

18. A spot welding machine as defined in claim 17, in which said control means performs said control while the arms are being opened, so as to set said arms to a desired opened state.

19. A spot welding machine as defined in claim 17, in which said control means temporarily performs said control while the arms are being closed immediately before the tip electrodes come into contact with the plates to be jointed, and said control means then immediately deactuates said brake means to allow said tip electrodes to come into contact with the plates, in such a manner that the electrodes make a soft landing on the plates.

20. A spot welding machine comprising:
   first and second tip electrodes for holding therebetween plates to be joined with a pressing force of a predetermined magnitude and causing current to flow through the plates;
   first and second arms for supporting the first and second tip electrodes and transmitting the pressing force of the predetermined magnitude to the first and second tip electrodes;

a pressing actuator for moving at least one of the first and second arms to apply the pressing force to said plates via said tip electrodes;

detection means for detecting a distance between the first and second tip electrodes; and speed control means for variably controlling a moving speed of said actuator in accordance with an output of said detection means, wherein said speed control means includes brake means for braking a movement of said pressing actuator and performs a speed reducing control by braking said actuator in accordance with the output of said detection means via said brake means, and wherein said brake means comprises a brake bush provided around the rod of said actuator, a cone-shaped spring for pressing said brake bush against said rod and a brake piston movable along the rod in response to a change in air pressure applied thereto in order to deform said cone-shaped spring against resilient force thereof, and wherein a brake force is applied to said rod by a frictional force produced between said brake bush and said rod.

21. A spot welding machine as defined in claim 20, in which said control means comprises a fluid-powered cylinder and includes a servo valve for successively changing a magnitude and direction of fluid pressure in two fluid chambers formed in said cylinder, and current control means for variably controlling, in accordance with the output of said detection means, an amplitude of signal current to be supplied to a driving coil of said servo valve.

22. A spot welding machine as defined in claim 20, in which said actuator comprises a fluid-powered cylinder, and said brake means brakes the movement of said actuator by means of fluid pressure control means for controlling a magnitude and direction of fluid pressure in the two fluid chambers formed in said cylinder.

23. A spot welding machine as defined in claim 22, in which said fluid pressure control means brakes the movement of said cylinder by performing ON/OFF control of a direction switching valve to switch a direction in which fluid is supplied to and discharged from the two fluid chambers.

24. A spot welding machine as defined in claim 20, in which said fluid pressure control means brakes said cylinder by throttling, via a throttle valve, an amount of fluid to be discharged from one of the two fluid chambers of said cylinder.

25. A spot welding machine as defined in claim 20, in which, when said arms are being closed to hold the plates therebetween, said speed control means performs a control to reduce a moving speed of said actuator in such a manner that said electrodes make a soft landing on the plates.

26. A spot welding machine as defined in claim 20, in which, when said arms are being closed, said speed control means performs a control to reduce the moving speed of said actuator as the distance between said electrodes approaches a predetermined target value.

27. A spot welding machine as defined in claim 20, in which, when said arms are being opened, said speed control means performs a control to reduce the moving speed of said actuator as the distance between said electrodes approaches a predetermined target value.

28. A spot welding machine comprising:
first and second tip electrodes for holding therebetween plates to be joined with a pressing force of a predetermined magnitude and causing current to flow through the plates;

first and second arms for supporting the first and second tip electrodes and transmitting the pressing force of the predetermined magnitude to the first and second tip electrodes;

a pressing actuator for moving at least one of the first and second arms to apply the pressing force to said plates via said tip electrodes;

detection means for detecting a distance between the first and second tip electrodes; and electrodes state determination means for determining, on the basis of an output of said detection means, whether or not the distance between said tip electrodes meets a predetermined reference value to thereby output a signal indicative of a state of said tip electrodes, wherein said predetermined reference value is at least one value selected from among a first reference value for determining whether said arms are in a predetermined wide-open position, a second reference value for determining whether said arms are in an intermediate position, a third reference value for determining whether said tip electrodes have securely held the plates therebetween a fourth reference value for determining whether said tip electrodes have come off the plates and a fifth reference value for determining whether said tip electrodes have worn more than a predetermined wear amount.

* * * * *